United States Patent
Kim et al.

(10) Patent No.: US 10,469,646 B2
(45) Date of Patent: Nov. 5, 2019

(54) METHOD AND APPARATUS FOR PROVIDING COMMUNICATION-RELATED INFORMATION

(71) Applicant: Samsung Electronics Co., Ltd., Gyeonggi-do (KR)

(72) Inventors: Han-Jib Kim, Gyeonggi-do (KR); Geon-Soo Kim, Gyeonggi-do (KR); Yong-Joon Jeon, Gyeonggi-do (KR); Bo-Kun Choi, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 121 days.

(21) Appl. No.: 14/972,655

(22) Filed: Dec. 17, 2015

(65) Prior Publication Data
US 2016/0191694 A1    Jun. 30, 2016

(30) Foreign Application Priority Data

Dec. 24, 2014 (KR) .................. 10-2014-0188294

(51) Int. Cl.
*H04W 4/20* (2018.01)
*H04M 1/725* (2006.01)
(Continued)

(52) U.S. Cl.
CPC . *H04M 1/72527* (2013.01); *H04M 1/274508* (2013.01); *H04M 1/56* (2013.01);
(Continued)

(58) Field of Classification Search
CPC . H04L 51/04; H04L 63/0281; H04L 65/1016; H04L 67/32; H04M 1/57;
(Continued)

(56) References Cited

U.S. PATENT DOCUMENTS 7,231,229 B1   6/2007   Hawkins et al.
8,726,171 B1   5/2014   Lachapelle et al.
(Continued)

FOREIGN PATENT DOCUMENTS

CN   102077682 A   5/2011
CN   103248561 A   8/2013
(Continued)

OTHER PUBLICATIONS

PCT International Search Report and Written Opinion of the International Searching Authority dated Apr. 1, 2016.
(Continued)

*Primary Examiner* — Quan M Hua
(74) *Attorney, Agent, or Firm* — Cha & Reiter, LLC

(57) ABSTRACT

An electronic device is provided including: a display unit that displays an indication of a communication counterpart; a processor configured to: select a first application from a plurality of applications that are associated with the communication counterpart based on a preset condition; and display a first indication of the first application on the display unit, wherein the first application is used for communication with the communication counterpart.

26 Claims, 24 Drawing Sheets

(51) Int. Cl.
*H04M 1/56* (2006.01)
*H04M 1/2745* (2006.01)

(52) U.S. Cl.
CPC .. *H04M 1/27455* (2013.01); *H04M 1/274583* (2013.01); *H04M 1/72566* (2013.01); *H04M 2250/60* (2013.01)

(58) Field of Classification Search
CPC ............... H04M 1/67; H04M 1/72519; H04M 2250/62; H04M 1/72522; H04M 1/72552; H04M 1/72544; H04M 1/72555; H04M 1/27455; H04M 1/274516; H04M 1/7255; H04M 1/72558; H04M 1/72561; H04M 1/72583; H04M 2250/16; H04M 2250/22; H04M 2250/52; H04W 4/008; H04W 4/16; H04W 76/02
See application file for complete search history.

(56) References Cited

U.S. PATENT DOCUMENTS

| | | | |
|---|---|---|---|
| 8,868,025 | B2 | 10/2014 | Ganesh et al. |
| 2003/0009530 | A1* | 1/2003 | Philonenko ............. H04L 41/18 709/206 |
| 2006/0046720 | A1 | 3/2006 | Toropainen et al. |
| 2007/0060205 | A1 | 3/2007 | Kim |
| 2007/0064906 | A1 | 3/2007 | Jain |
| 2009/0274286 | A1 | 11/2009 | O'Shaughnessy et al. |
| 2010/0262928 | A1* | 10/2010 | Abbott ................ G06F 3/04817 715/769 |
| 2010/0323752 | A1 | 12/2010 | Park et al. |
| 2011/0231407 | A1 | 9/2011 | Gupta et al. |
| 2011/0298618 | A1* | 12/2011 | Stahl ................. H04M 1/72519 340/573.1 |
| 2012/0047269 | A1 | 2/2012 | Leonov et al. |
| 2013/0215125 | A1* | 8/2013 | Mahajan ........... H04M 1/72525 345/522 |
| 2014/0038572 | A1 | 2/2014 | Yang et al. |
| 2014/0045470 | A1* | 2/2014 | Bridge .................... H04W 4/16 455/415 |
| 2014/0101617 | A1 | 4/2014 | Yang et al. |
| 2014/0206415 | A1 | 7/2014 | Kim |
| 2015/0373173 | A1* | 12/2015 | Taher ................ H04M 1/72519 370/328 |

FOREIGN PATENT DOCUMENTS

| | | |
|---|---|---|
| CN | 104144099 A | 11/2014 |
| KR | 10-2007-0049681 A | 5/2007 |
| KR | 10-2012-0072953 A | 7/2012 |
| KR | 10-2012-0107109 A | 9/2012 |
| KR | 10-2013-0068044 A | 6/2013 |
| WO | 2011/067676 A1 | 6/2011 |

OTHER PUBLICATIONS

European Search Report dated Jun. 8, 2018.
Chinese Search Report dated May 31, 2019.

* cited by examiner

METHOD AND APPARATUS FOR PROVIDING COMMUNICATION-RELATED INFORMATION

CLAIM OF PRIORITY

This application claims the priority under 35 U.S.C. § 119(a) to Korean Application Serial No. 10-2014-0188294, which was filed in the Korean Intellectual Property Office on Dec. 24, 2014, the entire content of which is hereby incorporated by reference.

TECHNICAL FIELD

The present disclosure relates to telecommunications and more particularly to a method and apparatus for providing communication related information.

BACKGROUND

Various types of applications (for example, referred to as "Apps") may be installed and executed in electronic devices, such as smartphones, tablet computers, and laptops. A given electronic device may execute a plurality of applications for contacting a particular communication counterpart. These applications may include telephony applications, messaging applications, email applications, to name a few. The sheer number of such applications could make it difficult to choose the communication application that is best-suited for contacting the communication counterpart.

Accordingly, the need exists for new techniques for selecting an application that is best-suited for contacting a particular communication counterpart.

SUMMARY

The present disclosure addresses the above need. According to one aspect of the disclosure, an electronic device is provided comprising: a display unit that displays an indication of a communication counterpart; a processor configured to: select a first application from a plurality of applications that are associated with the communication counterpart based on a preset condition; and display a first indication of the first application on the display unit, wherein the first application is used for communication with the communication counterpart.

According to another aspect of the disclosure, a method is provided comprising: executing an application in an electronic device; and displaying an indication of a communication counterpart, selecting a first application from a plurality of applications that are associated with the communication counterpart based on a preset condition; displaying a first indication of the first application; and establishing a communications session with the communication counterpart by using the first application.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
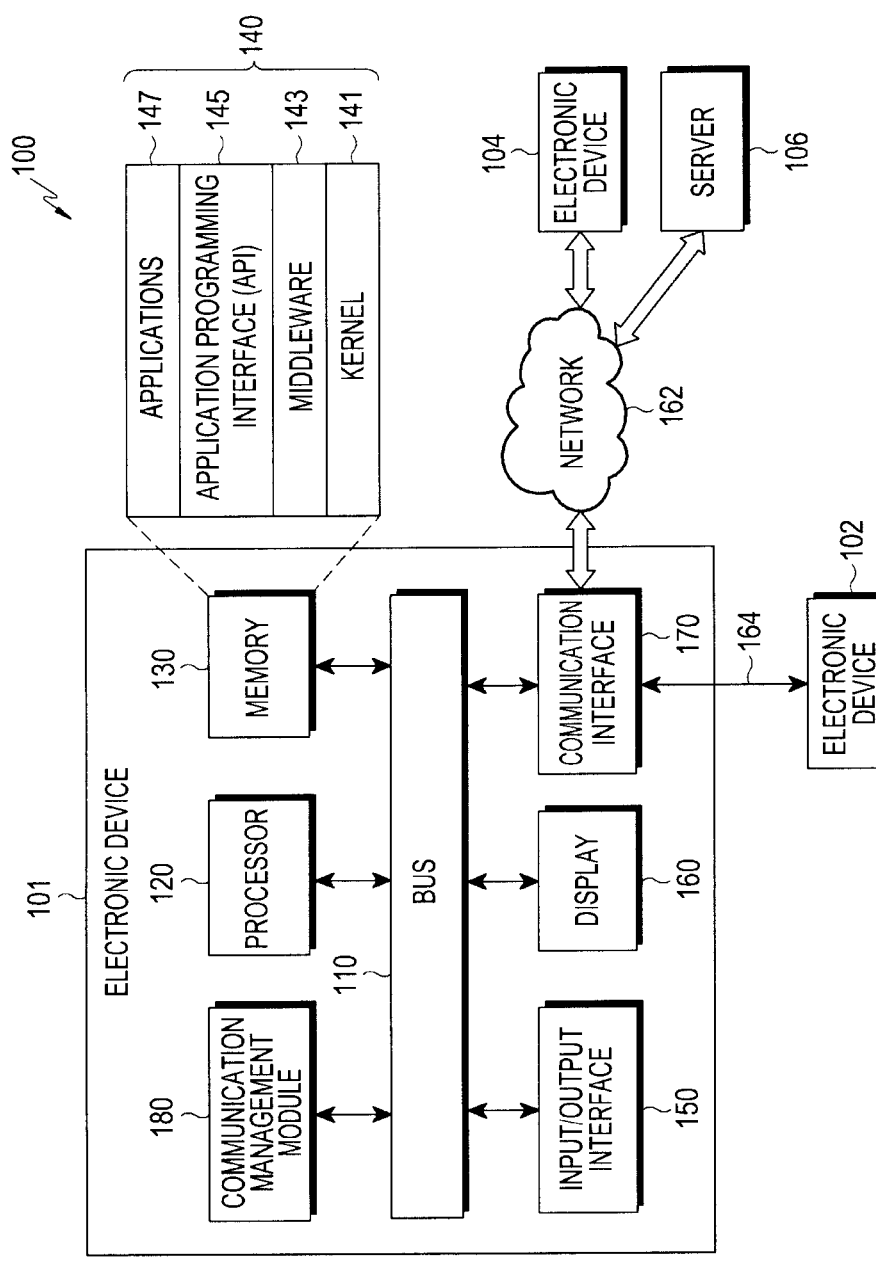
FIG. 1 is a diagram of an example of a network environment according to an embodiment of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the present disclosure, the expression "have", "may have", "include" or "may include" refers to existence of a corresponding feature (e.g., numerical value, function, operation, or components such as elements), and does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least A, (2) including at least B, or (3) including all or only one of A and B.

The expressions "a first", "a second", "the first", or "the second" used in various embodiments of the present disclosure may modify various components regardless of the order and/or the importance but does not limit the corresponding components. The expressions may be used to distinguish a component element from another component element. For example, a first user device and a second user device may indicate different user devices regardless of the sequence or importance thereof. For example, a first element may be termed a second element, and similarly, a second element may be termed a first element without departing from the scope of the present disclosure.

When it is mentioned that one element (e.g., a first element) is "(operatively or communicatively) coupled with/to or connected to" another element (e.g., a second element), it should be construed that the one element is directly connected to the other element or the one element is indirectly connected to the another element via yet another element (e.g., a third element). Conversely, when it is mentioned that one element (e.g., a first element) is "directly coupled" or "directly connected" to another element (e.g., a second element), it may be construed that no other element exists between the one element and the other element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, the singular forms may include the plural forms as well, unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

As used throughout the disclosure, the term "electronic device" may refer to any suitable type of electronic device. According to some embodiments, an electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

According to some embodiments, the electronic device may be a smart home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google Tv™), a game console (e.g., Xbox™ and PlayStation™), an electronic dictionary, an electronic key, a camcorder, and an electronic photo frame.

According to some embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, nautical equipment (e.g., a nautical navigation device, and a gyro-compass), avionics, security devices, an automotive head unit, a robot for home or industry applications, an automatic teller's machine (ATM), point of sale (POS) terminal, or a (home) appliance (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/ structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology The term "communication counterpart" may refer to an entity with which communications are conducted. For example, the communication counterpart may include at least one of a person, a store, a company, an institution, an organization, and a group.

The term "communication related application" may refer to a communication application or an application for providing communication related information.

The communication application may include at least one of a telephone call application, a messenger application, a social network service application, an e-mail transfer application, a text message transfer application, a voice message transfer application, and a multimedia message transfer application, and/or any other application that is capable of being used to exchange communications with a communication counterpart.

The term "communication related information" may refer to various types of information that may be used in relation to communication. The communication related information may include at least one of contacts, a call log, a missed call log, an outgoing call log, and an incoming call log.

An application for providing the communication related information may be any application that provides at least one piece of communication related information, and may include a contact application and a call log management application. In addition, according to various embodiments, the communication related information may be additionally provided by the communication application.

According to various embodiments of the present disclosure, the communication application and the communication related application may be the same as or different from each other. For example, a certain communication related application may merely provide a communication function or communication related information, and another communication related application may provide both a communication function and communication related information.

The term "communication application related information" may refer to information directly or indirectly related to a communication application (for example, a telephone call application, a messenger application, a social network service application, an e-mail transfer application, a text message transfer application, a voice message transfer application, and a multimedia message transfer application). For example, communication application related information may be represented by displaying each communication application through text, an icon, an image (for example, a thumbnail image), a color, and a sound.

The term "situation information" may refer to information related to time or place, information related to a current state, and information related to current settings. For example, situation information of a communication counterpart may include at least one of location information of the communication counterpart, schedule information of the communication counterpart, communication status information of the communication counterpart, presence information of the communication counterpart, information on a communication service to which the counterpart has subscribed, and electronic device state information of the communication counterpart. Situation information of a user may include at least one of location information of the user, schedule information of the user, communication status information of the user, presence information of the user, information on a communication service to which the user has subscribed, and electronic device state information of the user.

Hereinafter, an electronic device according to various embodiments of the present disclosure will be described with reference to the accompanying drawings. The term "user" used in the present specification may refer to a person or a device (for example, an artificial intelligence electronic device) using an electronic device.

An electronic device 101 in a network environment 100 according to various embodiments will be described with reference to FIG. 1. The electronic device 101 may include at least one of a bus 110, a processor 120, a memory 130, an input/output interface 150, a display 160, and a communication interface 170, and a communication management module 180. It will be understood that at least one of the elements of the electronic device 101 may be omitted, or other elements may be additionally included in the electronic device 101.

The bus 110 may include, for example, a circuit for connecting the elements 110 to 180 each other and transferring communication (for example, a control message and/or data) between the elements.

The processor 120 may include any suitable type of processing circuitry, such as a general-purpose processor (e.g., an ARM-based processor), a Field-Programmable Gate Array (FPGA), a Digital Signal Processor (DSP), an Application-Specific Integrated Circuit (ASIC), a Communication Processor (CP), an Application Processor (AP), etc. In operation, the processor 120 may carry out operations or data processing related to control and/or communication of at least one other element of the electronic device 101.

The memory 130 may include a volatile and/or non-volatile memory. For example, the memory 130 may store instructions or data related to at least one other element of the electronic device 101. According to one embodiment, the memory 130 may store software and/or a program 140. For example, the program 140 may include a kernel 141, a middleware 143, an Application Programming Interface (API) 145, and/or application situation programs (or applications) 147. At least some of the kernel 141, the middleware 143, and the API 145 may be referred to as an Operating System (OS).

For example, the kernel 141 may control or manage system resources (for example, the bus 110, the processor 120, and the memory 130) which are used to execute an operation or a function implemented in the other programs (for example, the middleware 143, the API 145, and the application programs 147). In addition, the kernel 141 may provide an interface through which the middleware 143, the API 145, and the application programs 147 may access the individual elements of the electronic device 101 to control or manage the system resources.

For example, the middleware 143 may serve as a relay for allowing the API 145 or the application programs 147 to communicate with the kernel 141 to exchange data. Furthermore, in regard to task requests received from the application programs 147, the middleware 143 may perform a control (for example, scheduling or load balancing) for the task requests, using a method of assigning, to at least one of the application programs 147, a priority for using the system resources (for example, the bus 110, the processor 120, and the memory 130) of the electronic device 101.

The API 145 is an interface through which the applications 147 control functions provided by the kernel 141 or the middleware 143, and may include at least one interface or function (for example, an instruction) for file control, window control, image processing, or text control.

For example, the input/output interface 150 may serve as an interface that may transfer instructions or data, which is input from a user or another external device, to the other elements of the electronic device 101. In addition, the input/output interface 150 may output the instructions or data, which is received from the other elements of the electronic device 101, to the user or the other external device.

For example, the display 160 may include a Liquid Crystal Display (LCD), a Light Emitting Diode (LED) display, an Organic Light Emitting Diode (OLED) display, a Micro Electro Mechanical Systems (MEMS) display, or an electronic paper display. The display 160 may display, for example, various types of content (for example, text, an image, a video, an icon, and a symbol) to a user. The display 160 may include a touch screen and receive, for example, a touch input, a gesture input, a proximity input, or a hovering input using an electronic pen or a user's body part.

For example, the communication interface 170 may set communication between the electronic device 101 and an external device (for example, a first electronic device 102, a second electronic device 104, or a server 106). For example, the communication interface 170 may be connected to a network 162 through wireless or wired communication to communicate with the external device (for example, the second electronic device 104 or the server 106). In addition, the communication interface 170 may directly communicate with the external device (for example, the first electronic device 102) through wireless or wired communication.

The wireless communication may use at least one of LTE, LTE-A, CDMA, WCDMA, UMTS, WiBro, and GSM as a cellular communication protocol. The wired communication may include at least one of, for example, a Universal Serial Bus (USB), a High Definition Multimedia Interface (HDMI), Recommended Standard 232 (RS-232), and a Plain Old Telephone Service (POTS). The network 162 may include at least one of communication networks such as a computer network (for example, a LAN or a WAN), the Internet, and a telephone network.

The first and second external electronic devices 102 and 104 may be the same or different device from the electronic device 101. According to one embodiment, the server 106 may include a group of one or more servers. According to various embodiments, the entirety and some operations executed in the electronic device 101 may be carried out in another electronic device or a plurality of electronic devices (for example, the first and second electronic device 102 and 104 and the server 106). According to one embodiment, when the electronic device 101 has to perform any function or service automatically or in response to a request, the electronic device 101 may request the other device (for example, the electronic device 102 or 104 or the server 106) to perform at least some functions related to the function or service, instead of autonomously executing the function or service or in addition. The other electronic device (for example, the electronic device 102 or 104 or the server 106) may carry out the requested function or the additional function and transfer the result, obtained by carrying out the function, to the electronic device 101. The electronic device 101 may process the received result as it is or additionally provide the requested function or service. To this end, a cloud computing technology, a distributed computing technology, or a client-server computing technology may be used.

Although the electronic device 101 includes the communication interface 170 to communicate with the external electronic device 104 or the server 106 through the network 162 in FIG. 1, the electronic device 101 may be implemented to independently operate therein without a separate communication function according to various embodiments of the present disclosure.

According to one embodiment, the server 106 may perform at least one operation (or function) implemented in the electronic device 101. For example, the server 106 may include a communication management server module (not illustrated) that can support the communication management module 180 implemented in the electronic device 101. For example, the communication management server module may include at least one element of the communication management module 180 to perform at least one of the operations (or functions) carried out by the communication management module 180 or act on behalf of the communication management module 180.

According to various embodiments of the present disclosure, the server 106 may be a communication related server that can provide various communication related functions to the electronic device 101. For example, the server 106 may be an instant messenger server, or may be a Short Message Service (SMS) server, a Multimedia Message Service (MMS) server, or a mobile switching center.

According to various embodiments of the present disclosure, the server 106 may also be a Rich Communication Suite (RCS) server. The RCS is a standard technology between communication companies for enabling functions such as instant messaging, live video sharing, and file transfer to be used, and may provide a voice call, text message transfer, file transfer, and data sharing in one application. For example, when the server 106 is constituted by an RCS server, a communication application according to an embodiment of the present disclosure may provide a user with a plurality of communication services through the RCS server in one application.

According to various embodiments of the present disclosure, when the server 106 is constituted by an RCS server, the communication interface 170 may obtain information by communicating with the RCS server through the network 162. In addition, various types of structuralized communications related information (for example, information on an address book and information on a communication log) may be stored in the memory 130. The processor 120 may perform necessary controls (for example, update of a database and configuration of a screen) on the basis of the various types of communication related information stored in the memory 130.

The communication management module 180 may process at least some pieces of information acquired from the other elements (for example, the processor 120, the memory 130, the input/output interface 150, and the communication interface 170) and provide the processed information to a user in various ways.

For example, according to various embodiments of the present disclosure, the communication management module 180 may receive situation information of a communication counterpart through the server 106 (for example, the RCS server) and provide at least one piece of communication application related information for each communication counterpart as a user executes a communication related application. Additional information on the communication management module 180 will be provided through FIG. 2 described below.

Although the communication management module 180 is illustrated as a separate module from the processor 120 in FIG. 1, at least a part of the communication management module 180 may be included in the processor 120 or at least one other module, and all of the functions of the communication management module 180 may be implemented in the illustrated processor 120 or another processor.

Figure 2:
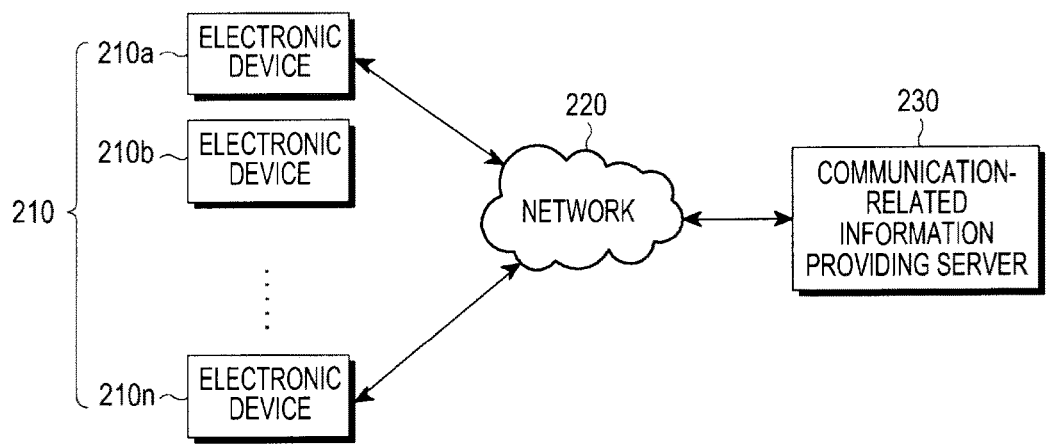
FIG. 2 is a diagram of an information providing system according to an embodiment of the present disclosure.

FIG. 2 is a diagram of an example of an information providing system according to an embodiment of the present disclosure. Referring to FIG. 2, an electronic device 210*a* may communicate with other electronic devices 210*b* to 210*n* through at least one communication application. According to various embodiments of the present disclosure, a communication related information providing server 230 may collect communication related information from the electronic device 210*a* through a network 220 and provide the collected communication related information to the other electronic devices 210*b* to 210*n*. For example, the communication related information providing server 230 may be an RCS server, and various embodiments of the present disclosure are not limited thereto.

According to various embodiments of the present disclosure, a communication related information providing server 230 may collect various types of situation information from the electronic device 210*a* and provide the collected situation information to the other electronic devices 210*b* to 210*n*. According to various embodiments of the present disclosure, the electronic devices 210*b* to 210*n* having received the various types of situation information of the counterpart from the communication related information providing server 230 may provide various types of communication related information for the counterpart using the provided information. In addition, according to various embodiments of the present disclosure, the electronic device 210*a* may also directly acquire situation information from the other electronic devices 210*b* to 210*n* without the communication related information providing server 230.

Figure 3:
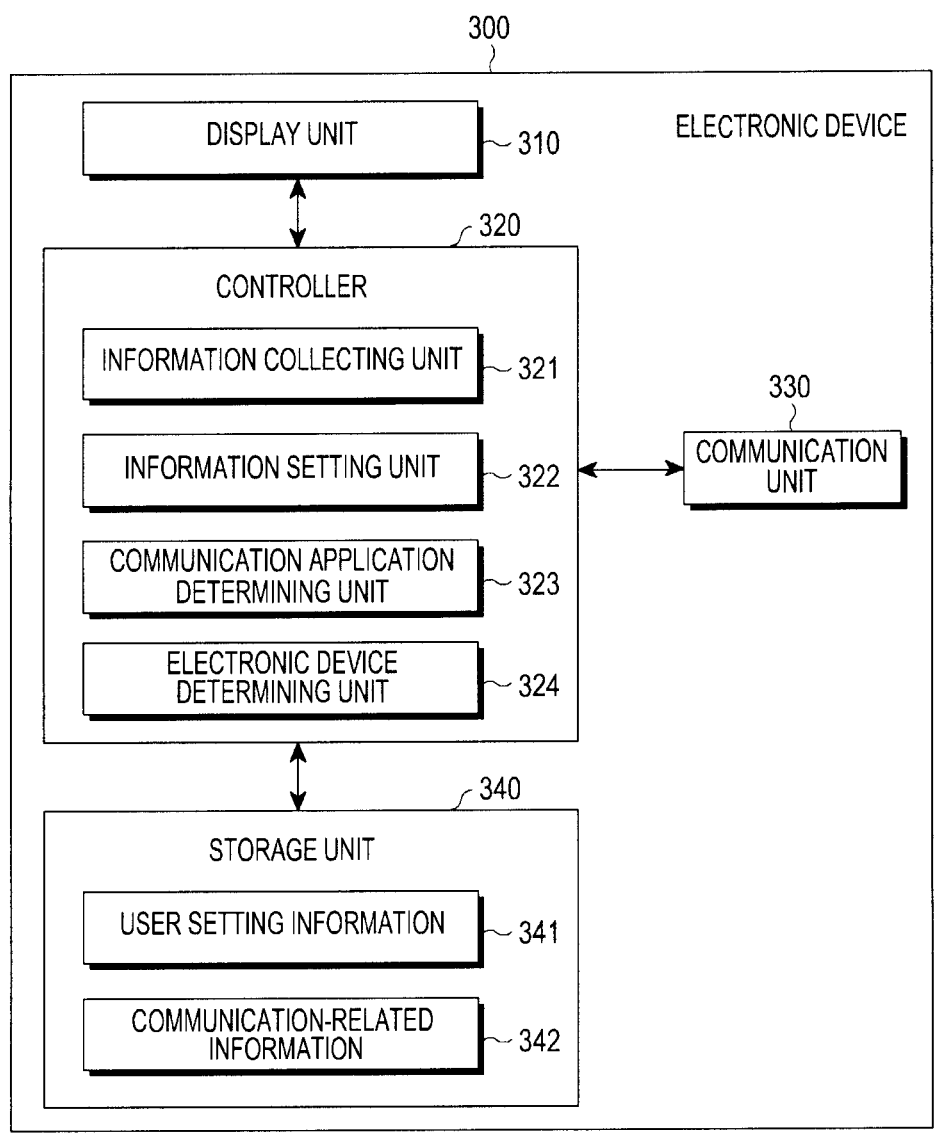
FIG. 3 is a block diagram of an example of an electronic device according to an embodiment of the present disclosure.

FIG. 3 is a block diagram of an example of an electronic device according to an embodiment of the present disclosure. According to various embodiments of the present disclosure, an electronic device 300 may include at least one of a display unit 310, a controller 320, a communication unit 330, and a storage unit 340. In addition, according to various embodiments of the present disclosure, the controller 320 may include at least one of an information collecting unit 321, an information setting unit 322, a communication application determining unit 323, and an electronic device determining unit 324.

The entire or some functions of the elements of the electronic device 300 illustrated in FIG. 3 may be included in at least one element illustrated in FIG. 1. For example, at least a part of the controller 320 may be included in the communication management module 180 or the processor 120 illustrated in FIG. 1. In addition, at least a part of the storage unit 340 may be included in the memory 130 illustrated in FIG. 1, and at least a part of the display unit 310 may be included in the display 160 illustrated in FIG. 1.

The information collecting unit 321 of the controller 320 may collect communication related information and/or situation information corresponding to a user of the electronic device 300 or communication related information and/or situation information for a communication counterpart. The information collecting unit 321 may receive communication related information and/or situation information corresponding to a communication counterpart by accessing a server (for example, the communication related information providing server 230) through the communication unit 330, or may receive communication related information and/or situation information from an electronic device of each communication counterpart.

As described above, the communication related information collected by the information collecting unit 321 may include various types of information which may be used in relation to communication. The collected communication related information may include at least one of contacts, a call log, a missed call log, an outgoing call log, and an incoming call log. In addition, the situation information collected by the information collecting unit 321 may include information related to time or place, information related to a current state, and information related to current settings. For example, situation information of a communication counterpart may include at least one of location information (e.g., an indication of a current location of the communication counterpart), schedule information (e.g., a calendar entry), communication status information (e.g., on the phone, call waiting, call termination), presence information, and an indication of a state of an electronic device associated with the communication counterpart (e.g., power off, power on, idle mode, manner mode) and an identification of a communication service to which the counterpart has subscribed. Situation information of a user may include at least one of location information (e.g., an indication of a current location of the user and/or the device 300), schedule information, communication status information, presence information, an indication of a state of an electronic device associated with the user and an identification of a communication service to which the user has subscribed. The communication related information collected through the information collecting unit 321 may be stored as communication related information 342 in the storage unit 340.

The information setting unit 322 may provide a function by which a user sets at least one piece of communication related information through the electronic device 300. For example, according to various embodiments of the present disclosure, the information setting unit 232 may set a priority for a communication application and may display communication related information when a communication related application is executed. User setting information 341 set through the information setting unit 322 may be stored in the storage unit 340.

According to various embodiments of the present disclosure, when a user executes a communication related application in the electronic device 300, the communication related information collected by the information collecting unit 321 may be displayed through the display unit 310 according to the settings of the information setting unit 322.

The communication application determining unit 323 may select one of a plurality of communication applications registered for respective communication counterparts based on a preset condition. When a user executes a communication related application, information on at least one communication application that is determined to satisfy the preset condition may be displayed through the display unit 310. Detailed descriptions of various examples of the preset condition will be given below.

The electronic device determining unit 324 may select on of a plurality of electronic devices registered for respective communication counterparts based on a preset condition. When a user executes a communication related application, information on at least one electronic device that is determined to satisfy the preset condition may be displayed through the display unit 310. Detailed descriptions of various examples of the preset condition will be given below.

An electronic device according to any one of various embodiments of the present disclosure may include: a display unit that displays communication related information including at least one piece of communication application related information for at least one communication counterpart as a communication related application is executed; a processor that compares a plurality of communication applications registered for each communication counterpart with a preset condition and displays on the display unit information related to at least one communication application satisfying the preset condition; and a communication unit that provides communication with the communication counterpart by a communication application selected from the at least one communication application.

According to various embodiments of the present disclosure, the preset condition may include a condition set for at least one piece of situation information of the communication counterpart.

According to various embodiments of the present disclosure, the situation information may include at least one of location information of the communication counterpart, schedule information of the communication counterpart, communication state information of the communication counterpart, presence information of the communication counterpart, information on a communication service to which the communication counterpart has subscribed, and electronic device state information of the communication counterpart.

According to various embodiments of the present disclosure, the preset condition may include a condition that is set for at least one piece of situation information of a user using the electronic device.

According to various embodiments of the present disclosure, the situation information may include at least one of location information of the user, schedule information of the user, communication state information of the user, presence information of the user, information on a communication service to which the user has subscribed, and electronic device state information of the user.

According to various embodiments of the present disclosure, the communication related application may include a communication application or an application for providing communication related information.

According to various embodiments of the present disclosure, the communication application may include at least one of a telephone call application, a messenger application, a social network service application, an e-mail transfer application, a text message transfer application, a voice message transfer application, and a multimedia message transfer application.

According to various embodiments of the present disclosure, the communication related information may include at least one of contacts, a call log, a missed call log, an outgoing call log, and an incoming call log.

According to various embodiments of the present disclosure, the preset condition may include a priority set by a user using the electronic device or a priority set by the communication counterpart.

According to various embodiments of the present disclosure, the priority may be determined based on at least one piece of situation information of the communication counterpart.

Figure 4:
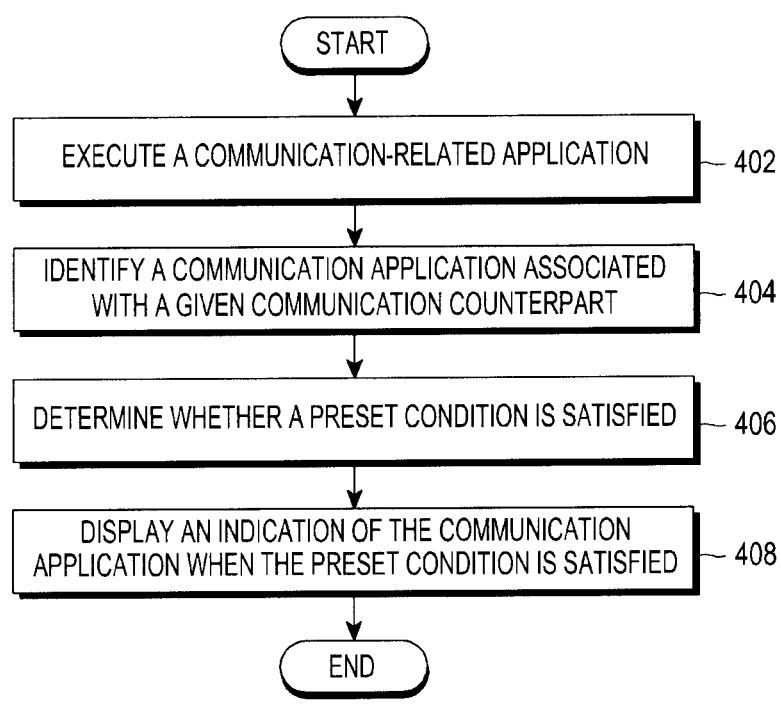
FIG. 4 is a flowchart of an example of a process according to an embodiment of the present disclosure.

FIG. 4 is a flowchart of an example of a process according to an embodiment of the present disclosure. Referring to FIG. 4, when a communication related application is executed in step 402, an electronic device may identify at least one communication application associated with a given communication counterpart, in step 404.

In step 406, the electronic device may determine whether a preset condition is satisfied. In some implementations, the preset condition may be based on situation information, such as current location of the electronic device. In some implementations, the preset condition may be satisfied by a given application if the current location of the electronic device matches a predetermined location that is associated with the given application.

In step 408, the electronic device may display information on the at least one communication application if the at least one communication application satisfies the preset condition. For example, the electronic device may display any suitable indication of the communication application, such as an icon. The indication may be displayed inside the interface of the communication related application (e.g., inside a contact list displayed by the communication related application).

At least one of the operations illustrated in FIG. 4 may be omitted, or at least one other operation may be added between the operations. In addition, the operations may be sequentially processed as illustrated in FIG. 4, and the execution sequence of at least one operation may be switched with that of another operation. Furthermore, the operations illustrated in FIG. 4 may be performed in the electronic device or a server. Moreover, at least one of the operations illustrated in FIG. 4 may be performed in the electronic device, and the rest of the operations may be performed in a server.

A method of operating an electronic device according to any one of various embodiments of the present disclosure may include: executing a communication related application in an electronic device; and at least partially displaying communication related information for at least one communication counterpart, wherein the communication related information may include information related to at least one communication application satisfying a preset condition among a plurality of communication applications registered for each communication counterpart.

According to various embodiments of the present disclosure, the preset condition may include a condition set for at least one piece of situation information of the communication counterpart.

According to various embodiments of the present disclosure, the situation information may include at least one of location information of the communication counterpart, schedule information of the communication counterpart, communication state information of the communication counterpart, presence information of the communication counterpart, information on a communication service to the communication counterpart has subscribed, and electronic device state information of the communication counterpart.

According to various embodiments of the present disclosure, the preset condition may include a condition that is set for at least one piece of situation information of a user using the electronic device.

According to various embodiments of the present disclosure, the situation information may include at least one of location information of the user, schedule information of the user, communication state information of the user, presence information of the user, an identification of a service to the user has subscribed, and electronic device state information of the user.

According to various embodiments of the present disclosure, the communication related application may include a communication application or an application for providing communication related information.

According to various embodiments of the present disclosure, the communication application may include at least one of a telephony application, a messaging application, a social network service application, an e-mail transfer application, a text message transfer application, a voice message transfer application, and a multimedia message transfer application.

According to various embodiments of the present disclosure, the communication related information may include at least one of a contacts list, a call log, a missed call log, an outgoing call log, and an incoming call log.

According to various embodiments of the present disclosure, the preset condition may include a priority set by a user using the electronic device or a priority set by the communication counterpart.

According to various embodiments of the present disclosure, the priority may be determined based on at least one piece of situation information of the communication counterpart.

Hereinafter, methods of providing communication related information according to various embodiments of the present disclosure will be described in detail with reference to FIGS. 5 to 26. In addition, the following methods of providing communication related information may be implemented in the elements of the electronic device illustrated in FIGS. 1 to 3.

Figure 5:
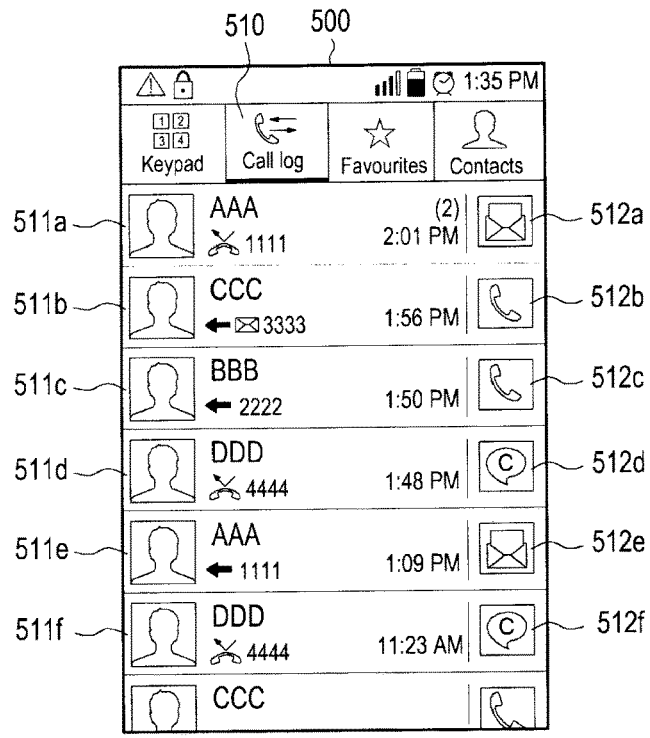
FIG. 5 illustrates an example of a screen representing a communication log in a communication related application according to various embodiments of the present disclosure.
Figure 6:
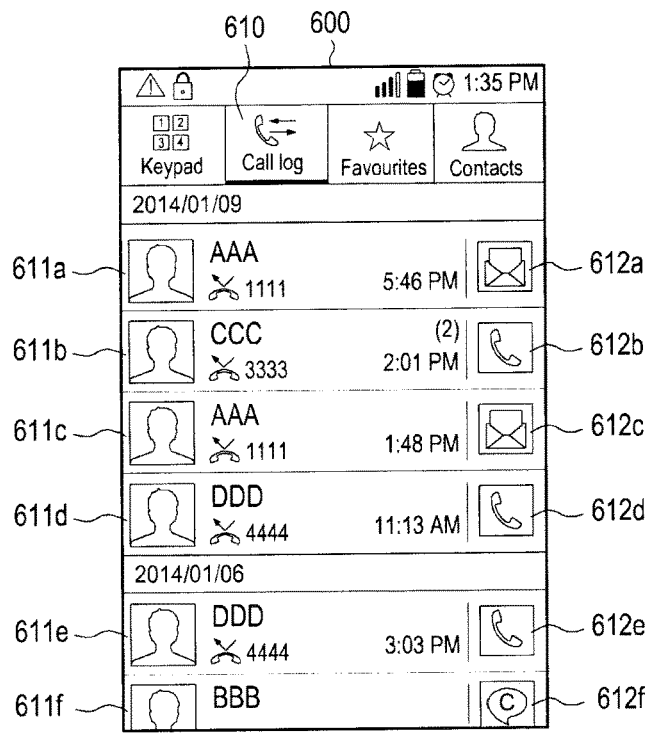
FIG. 6 illustrates an example of a screen representing a missed call log in a communication related application according to various embodiments of the present disclosure.

FIG. 5 illustrates an example of a screen representing a communication log in a communication related application according to various embodiments of the present disclosure, and FIG. 6 illustrates an example of a screen representing a missed call log in a communication related application according to various embodiments of the present disclosure.

Referring to FIG. 5, when a user executes a communication related application (for example, a telephone application) and selects a check on a call log 510, various types of communication related information may be displayed on a screen 500. For example, communication records may be sequentially displayed in a chronological order from the latest communication record. As illustrated in FIG. 5, communication records, such as a missed call 511a for user AAA, a received text message 511b for user CCC, an incoming call 511c for user BBB, a missed call 511d for user DDD, an incoming call 511e for user AAA, and a missed call 511f for user DDD, may be sequentially displayed.

According to various embodiments of the present disclosure, information related to at least one communication application through which communication may be made with the corresponding communication counterpart may be displayed in each communication record. As illustrated in FIG. 5, the information related to each communication application may be displayed in an icon or thumbnail image form. For example, an image 512a, 512b, 512c, 512d, 512e, or 512f for any one of a telephone call, a text message, and an instant messenger may be displayed as the information related to the communication application so that it is possible for the user to identify at least one communication application through which communication may be made with the corresponding communication counterpart. Although in this example images 512a-f are displayed, in other implementations any suitable type of indication of a communication application may be displayed instead of the images, such as text labels, for instance.

The communication application displayed for each communication counterpart may be determined according to various embodiments of the present disclosure. For example, the communication application may be determined in view of situation information of a user or situation information of each communication counterpart.

Referring to FIG. 5, a text message transfer application may be displayed as the communication application for user AAA, a telephone call application may be displayed for user BBB and user CCC, and an instant messenger application may be displayed for user DDD.

According to various embodiments of the present disclosure, log information related to a telephone call (for example, a missed call, an outgoing call, or an incoming call) may be recorded and managed in an electronic device. For example, as illustrated in FIG. 6, when a user identifies a missed call log, the electronic device may provide the user with information related to a missed call (for example, a sender name, reception time, the number of calls, and a priority of a missed call) among communication records.

Referring to FIG. 6, missed call records, such as a missed call 611a for user AAA, a missed call 611b for user CCC, a missed call 611c for user AAA, a missed call 611d for user DDD, a missed call 611e for user DDD, and a missed call 611f for user BBB, may be sequentially displayed.

According to various embodiments of the present disclosure, information related to at least one communication application through which communication may be made with the corresponding communication counterpart may be displayed in each missed call record. As illustrated in FIG. 6, the information related to each communication application may be displayed in an icon or thumbnail image form. For example, an image 612a, 612b, 612c, 612d, 612e, or 612f for any one of a telephone call, a text message, and an instant messenger may be displayed as the information related to the communication application so that it is possible to identify at least one communication application through which communication may be made with the corresponding communication counterpart.

The communication application displayed for each communication counterpart may be determined according to various embodiments of the present disclosure. For example, the communication application may be determined in view of a user's situation information or each communication counterpart's situation information.

The user may carry out an operation related to a missed call to attempt communication with the sender of the missed call. For example, the user may attempt communication with a communication counterpart (for example, the sender) by selecting a missed call number, by selecting an icon related to a missed call, or by selecting a missed call sender's phone number in the contact list.

According to various embodiments of the present disclosure, when the electronic device displays information on the sender of a missed call to the user, the electronic device may display information through which communication may be made, in consideration of the missed call sender's current situation information (for example, whether a telephone call can be made, whether a message can be received, current location information, or a schedule) as illustrated in FIG. 6, in addition to the missed call sender's phone number.

For example, when the missed call sender can currently receive only a text message rather than a telephone call, the electronic device may display a communication method, through which a reply may be made to the missed call, in another way except for a telephone call. By way of example, the electronic device may change information related to the missed call (for example, a direct call icon and a telephone call function in a menu) into information related to text message transfer (for example, a message transfer icon and a message transfer function in a menu).

According to various embodiments of the present disclosure, in order to determine communication application information for each communication counterpart, the electronic device may acquire the counterpart's situation information (for example, whether a telephone call can be made, whether a message can be received, current location information, or a schedule). Next, for each counterpart, the electronic device may identify a plurality of communication applications that can be used to contact the counterpart. Next, the electronic device may identify those applications from the plurality that satisfy a preset condition. When there is more than one application satisfying the preset condition, the electronic device may select one of the applications satisfying condition based on a priority of that application. For instance, the electronic device may compare respective priorities that are assigned to the applications satisfying the preset condition and select the one having the highest priority.

According to various embodiments of the present disclosure, the situation information (for example, status information) on the missed call sender may be collected by making a request for the current status to the communication counterpart (for example, the sender of the missed call) by the user.

For example, when the user takes an action for identifying a missed call log, the electronic device may request the current situation information from the missed call sender. In another example, when a missed call is made, the user's electronic device may periodically request the missed call sender's electronic device to update the current situation information. In another example, the user's electronic device may request an update on the current situation from the missed call sender's electronic device at a time point when the user identifies specific information on the missed call. In another example, the user may identify a missed call and directly update information on the missed call sender or identify details of the missed call, whereby an update may be made manually.

According to various embodiments of the present disclosure, when the missed call sender's situation changes, updated situation information on the missed call sender may be received. For example, the situation information on the missed call sender may be transmitted to the user's electronic device when the missed call sender's situation changes, for example, when the missed call sender moves to a different place (for example, when the counterpart wants to make a call using a home phone after making a call using a cellular phone in a different place), when the missed call sender cannot receive a call (for example, when the counterpart has a meeting, is driving a car, or has a preset schedule), when connection with the missed call sender is impossible (for example, when the counterpart's electronic device is turned off), or when the communication method changes (for example, Wi-Fi or roaming). The missed call sender may also periodically transmit his/her current situation information.

Figure 7:
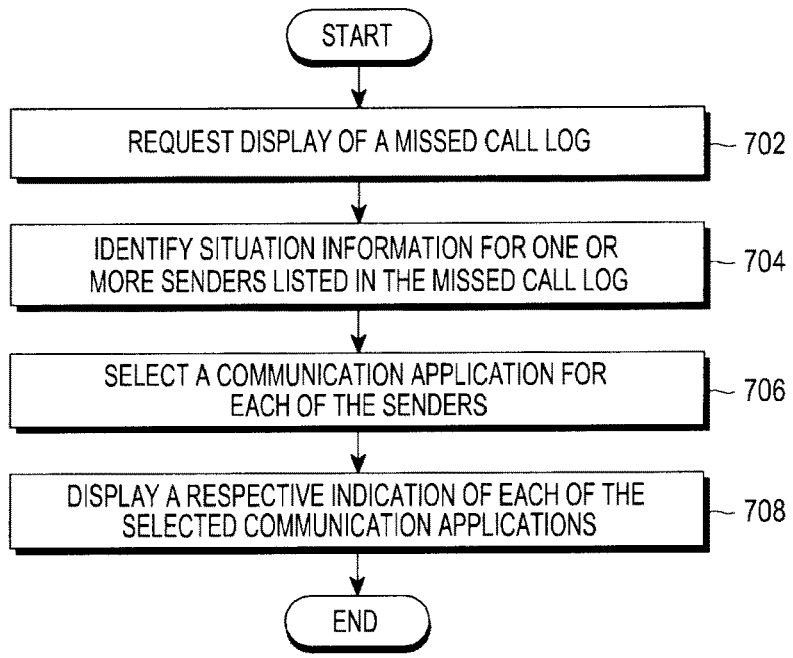
FIG. 7 is a flowchart of an example of a process for displaying a missed call according to various embodiments of the present disclosure.

FIG. 7 is a flowchart of an example of a process for displaying a missed call log according to various embodiments of the present disclosure. Although this example is presented with respect to a missed call log is used, in other implementations any suitable type of communications log may be used (e.g., an incoming call log, a receive messages list, etc.).

In step 702, a display of a missed call log is requested in step 702. The missed call log may identify a plurality of missed calls and senders (communication counterparts) that have initiated the missed calls. In step 704, situation information on the missed call senders (communication counterparts) may be identified.

In step 706, at least one communication application for each missed call sender may be determined according to the identified situation information. In step 708, the at least one determined communication application may be displayed for each missed call sender.

Figure 8:
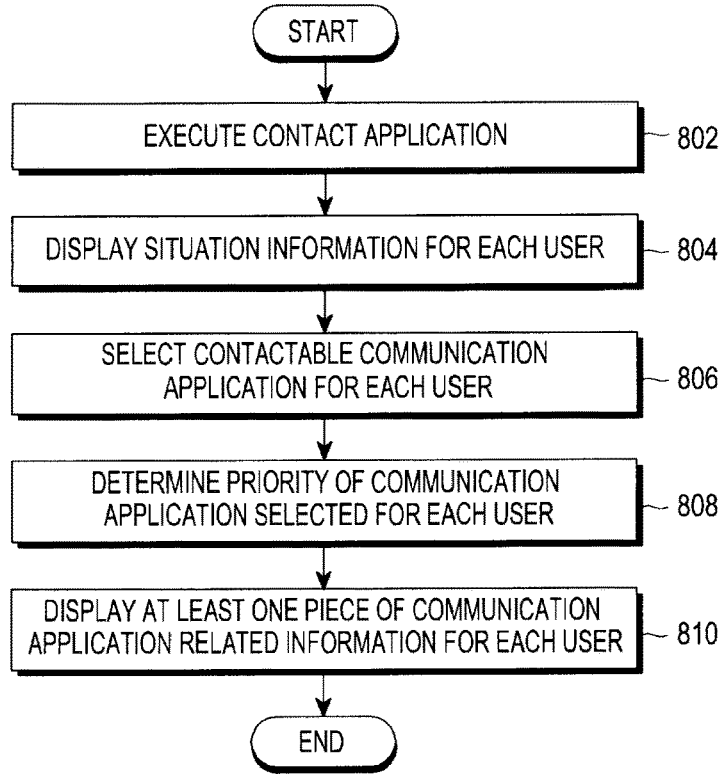
FIG. 8 is a flowchart of an example of a process for executing a contact application according to various embodiments of the present disclosure.

FIG. 8 is a flowchart of an example of a process for executing a contact application according to various embodiments of the present disclosure. Referring to FIG. 8, when a contact application among communication related applications is executed in step 802, an electronic device may identify situation information for each communication counterpart listed in a contacts list displayed by the contact application, in step 804.

When more than one contactable communication application is found for each counterpart in step 806, the electronic device may select one of those applications based on a preset condition, in step 808.

In step 810, information related to at least one communication application may be displayed on a screen for each communication counterpart according to the priority. As noted above, the information may include an indication of the communication application.

According to various embodiments of the present disclosure, various types of information on a communication counterpart (for example, a cell phone number, a home phone number, a company phone number, an instant messenger address, a social network service address, and an e-mail address) may be stored by the contact application. In addition, when the contact application is executed, a direct call function may be displayed through, for example, an icon or a menu beside a name in each communication counterpart's contact. The user may rapidly make a call to the corresponding communication counterpart through the icon or the menu.

According to various embodiments of the present disclosure, a method of providing a function of directly communicating with a communication counterpart may include an operation of dynamically changing and providing situation information of a communication counterpart. For example, when a communication counterpart can make a call, a telephone call icon may be displayed, and when the communication counterpart can receive a text message but not a telephone call, a text message icon may be displayed. In addition, when a communication counterpart is not reachable via telephone, an e-mail application may be displayed in an icon form.

According to various embodiments of the present disclosure, a contactable means may be set according to a counterpart's current situation (for example, whether a telephone call can be made, whether a message can be received, a location, time, communication status, or a schedule) or a priority set by the user (for example, a preferred contact means, a priority according to a counterpart, or the user's current situation (for example, a place, time, or communication status)).

For example, while a communication counterpart can make a connection through all methods such as a telephone call, a message, and e-mail, when the user prefers to communicate with the corresponding communication counterpart using messages, the electronic device may display an indication of a messaging application as a contactable communication means in the contact information of the corresponding communication counterpart.

Figure 9:
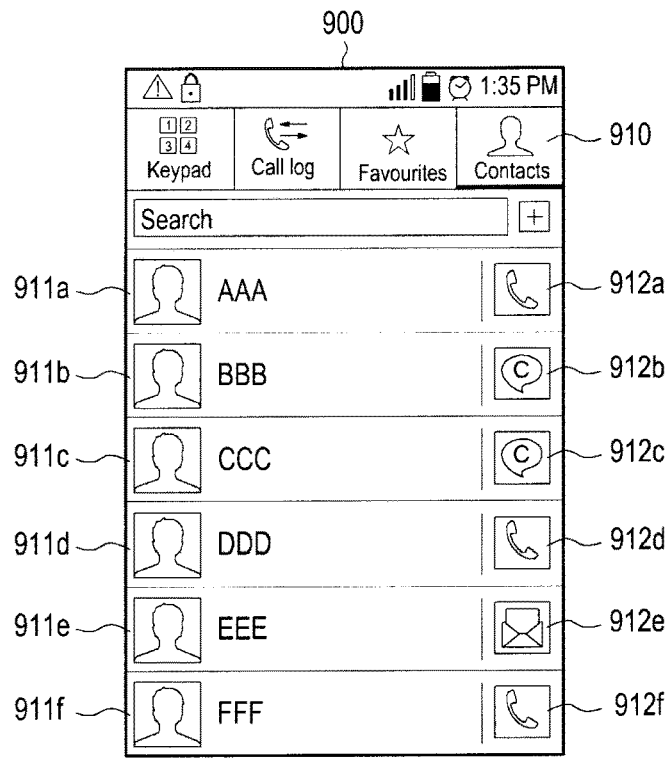
FIG. 9 illustrates communication related information reflecting situation information of a communication counterpart according to various embodiments of the present disclosure.
Figure 10:
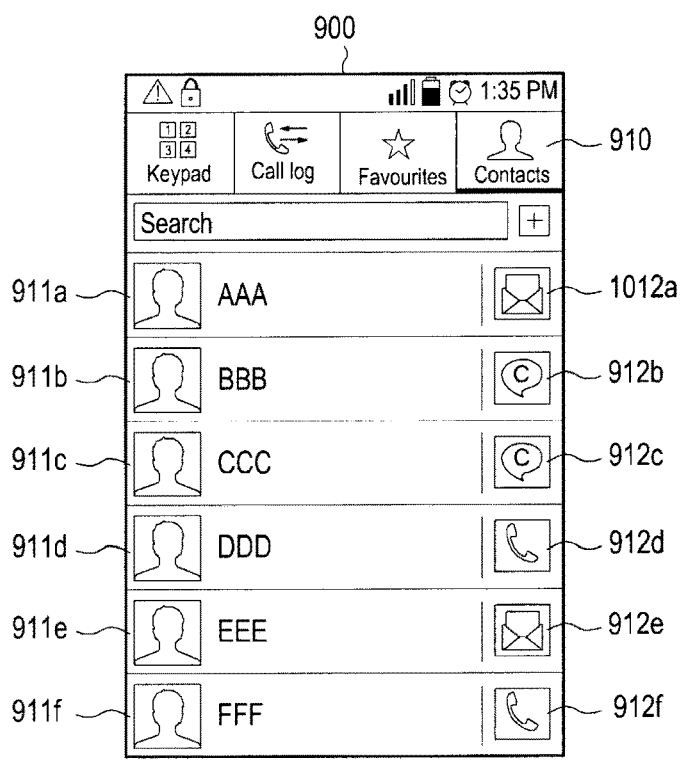
FIG. 10 illustrates communication related information reflecting situation information of a communication counterpart according to various embodiments of the present disclosure.

FIGS. 9 and 10 illustrate communication related information reflecting situation information of a communication counterpart according to various embodiments of the present disclosure.

As illustrated in FIG. 9, when a contact application is executed, a list of communication counterparts is displayed. For each counterpart, the communication application displays (for example, an icon) for performing a direct connection function. The icons may be differently displayed according to communication counterparts.

Referring to FIG. 9, when a contact application 910 is executed on a screen 900 of an electronic device, communication counterparts registered in the contact list may be displayed as AAA (911a), BBB (911b), CCC (911c), DDD (911d), EEE (911e), and FFF (9110. According to various embodiments of the present disclosure, as illustrated in FIG. 9, telephone call icons, instant messenger icons, text message icons, and e-mail icons may be displayed as communication application related information for the respective communication counterparts on the screen 900 of the electronic device.

For example, in FIG. 9, telephone call icons 912a, 912d, and 912f may be displayed in regions where communication application related information is displayed for AAA (911a), DDD (911d), and FFF (9110 which are communication counterparts which may be called. Instant messenger icons 912b and 912c may be displayed in regions where communication application related information is displayed for BBB (911b) and CCC (911c) which are communication counterparts with whom an instant messenger may be executed. An e-mail icon 912e may be displayed in a region where communication application related information is displayed for EEE (911e) which is a communication counterpart with whom connection via e-mail is possible.

According to various embodiments of the present disclosure, when situation information on a communication counterpart changes, the indication of the communication application for reaching that counterpart may be replaced with an indication of another application that is more suitable for reaching the communication counterpart, in view of the change in the counterpart's information. For example, referring to FIG. 10, when AAA (911a) cannot be called due to a conference schedule, the user's electronic device may acquire situation information from the electronic device of AAA (911a) and change the telephone call icon 912a to a message icon 1012a as illustrated.

Figure 11:
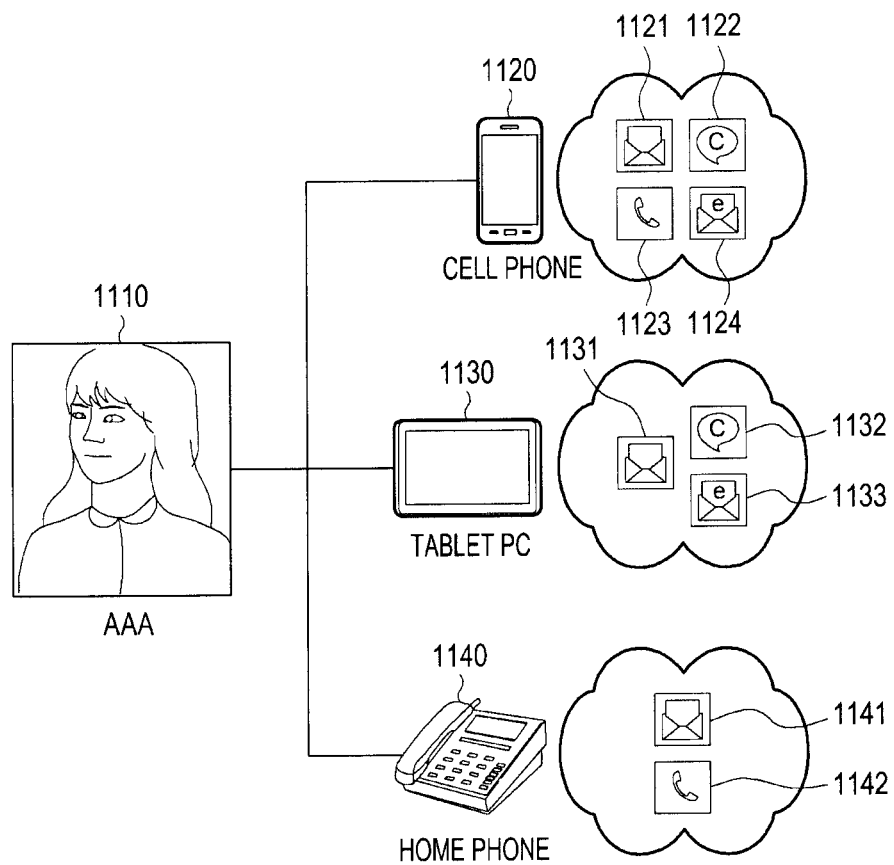
FIG. 11 is a diagram illustrating an example in which a communication counterpart uses multiple devices according to various embodiments of the present disclosure.

FIG. 11 is a diagram illustrating an example in which a communication counterpart uses multiple devices according to various embodiments of the present disclosure. Referring to FIG. 11, a plurality of electronic devices may be registered for one user or communication counterpart.

According to various embodiments of the present disclosure, the user may register one or more electronic devices, for example, a cell phone, a tablet PC, a home phone, a notebook computer, a Personal Computer (PC), and a television (TV). The respective electronic devices may support different communication methods according to characteristics thereof (for example, a communication method to support, a rate system, or mobility).

For example, as illustrated in FIG. 11, when user AAA (1110) has a cell phone 1120, a tablet PC 1130, and a home phone 1140, the respective electronic devices may use different communication methods according to characteristics thereof.

For example, the cell phone 1120 may support applications such as a telephone call application 1123, a text message application 1121, an instant messenger application 1122, and an e-mail application 1124, the tablet PC 1130 may support a text message application 1131, an instant messenger application 1132, and an e-mail application 1133, and the home phone 1140 may merely support a telephone call application 1142 and a text message application 1141.

According to various embodiments of the present disclosure, when several electronic devices are registered for one communication counterpart in a user's electronic device, the electronic device may display an icon for at least one communication application capable of performing communication to correspond to the communication counterpart's situation (for example, a location, time, a preferred terminal, or a network status).

For example, referring to FIG. 11, a communication counterpart referred to as user AAA (1110) registers and uses one or more electronic devices, and the electronic devices used by the communication counterpart may be registered and managed in the user's contact list. For example, the communication counterpart's electronic devices registered to the user may include a cell phone and a home phone as illustrated in FIG. 11, and the electronic devices may include at least one contactable means (for example, a telephone call application, a text message application, an instant messenger application, and an e-mail application)

In cases where a particular communication counterpart uses one or more electronic devices and each electronic device includes at least one contactable communication application, when a contactable means for the communication counterpart is displayed to the user, a contact means (for example, a contactable electronic device and/or a contactable communication application) that can be connected to the user's contact list may be identified to the user based on the communication counterpart's situation.

Figure 12:
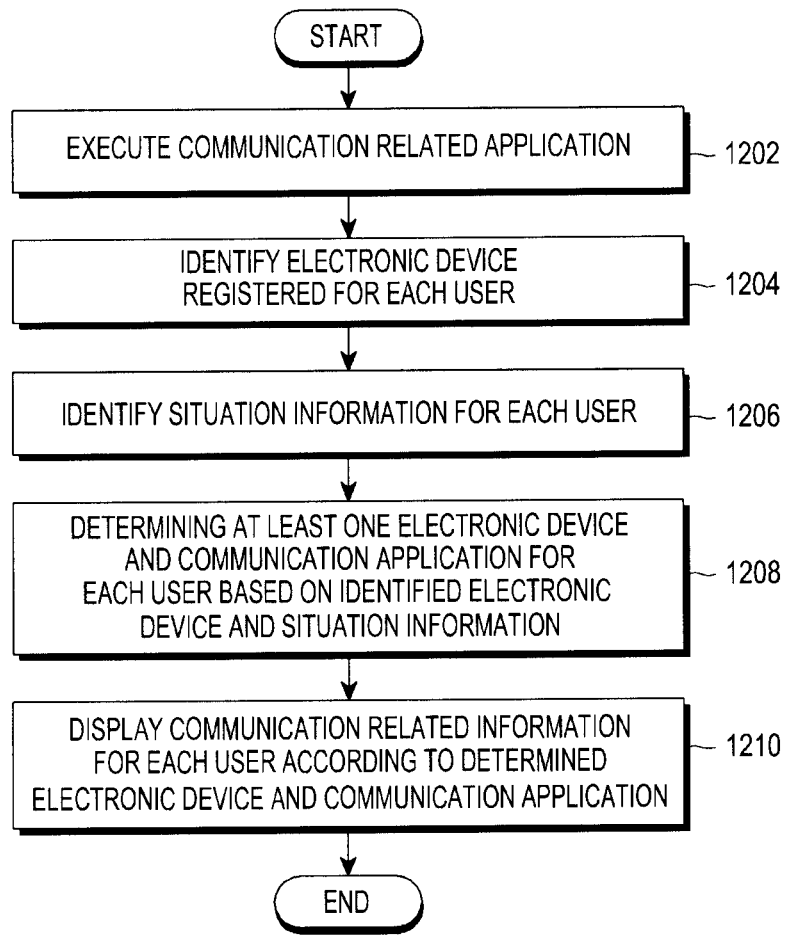
FIG. 12 is a flowchart of an example of a process according to various embodiments of the present disclosure.

FIG. 12 is a flowchart of an example of a process according to various embodiments of the present disclosure. Referring to FIG. 12, when a communication related application is executed in step 1202, a list of users (communication counterparts) may be identified. Next, for each of the users, a respective electronic device may be identified that is associated with that user (communication counterpart), in step 1204. In step 1206, situation information for each user may be identified, and in step 1208, at least one communication application for reaching the user may be selected for each user on the basis of the situation information. In instances in which a user is associated with a plurality of electronic devices, one of these electronic devices may also be selected based on the situation information, in step 1208. In step 1210, communication related information (for example, information related to a communication application) for each user may be displayed according to the determined electronic device and communication application. The communication related information may identify at least one of the selected application for reaching the user and an electronic device associated with the user.

According to various embodiments of the present disclosure, when a plurality of electronic devices have been registered for a given counterpart registered to the user in the electronic device, the electronic device may determine and display a method of communicating with the counterpart's electronic device, based on the user's priority.

At least one of the operations illustrated in FIG. 12 may be omitted, or at least one other operation may be added between the operations. In addition, the operations may be sequentially processed as illustrated in FIG. 12, and the execution sequence of at least one operation may be switched with that of another operation. Furthermore, the operations illustrated in FIG. 12 may be performed in the electronic device or a server. Moreover, at least one of the operations illustrated in FIG. 12 may be performed in the electronic device, and the rest of the operations may be performed in a server.

According to various embodiments of the present disclosure, when a communication application is executed, an electronic device registered for each user may also be identified after identification of each user's situation information. In addition, when the communication application is executed, identifying each user's situation information and identifying the electronic device registered for each user may also be simultaneously performed.

Figure 13:
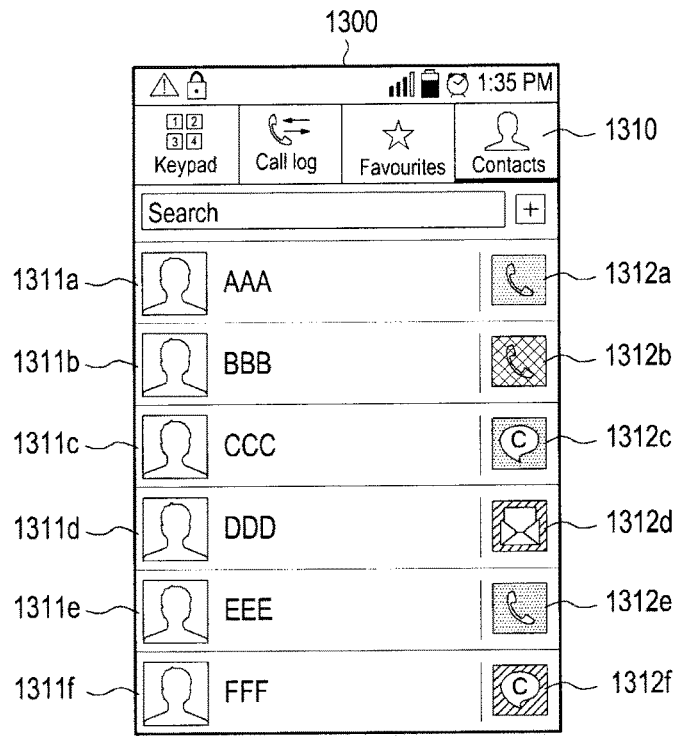
FIG. 13 illustrates communication related information including multiple devices of a communication counterpart according to various embodiments of the present disclosure.
Figure 14:
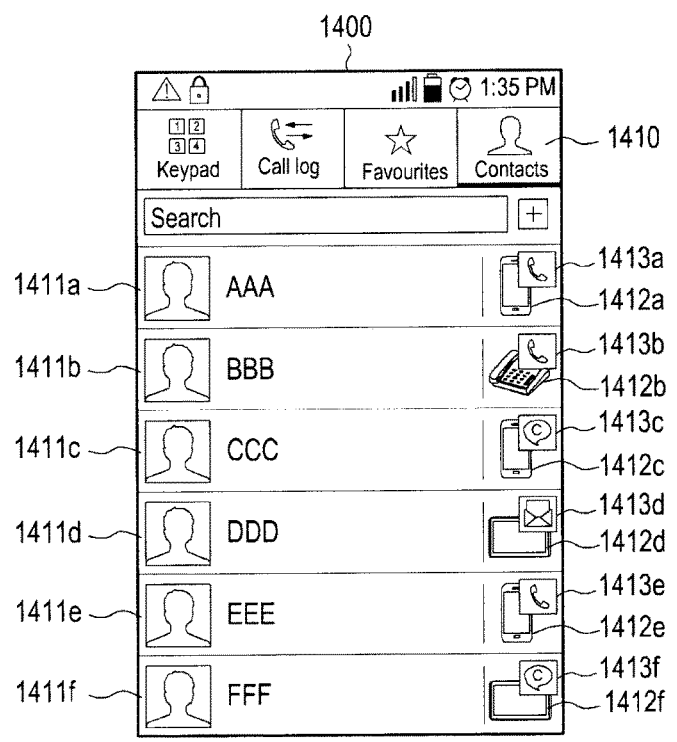
FIG. 14 illustrates communication related information including multiple devices of a communication counterpart according to various embodiments of the present disclosure.

FIGS. 13 and 14 illustrate communication related information including multiple devices of a communication counterpart according to various embodiments of the present disclosure.

As illustrated in FIG. 13, when a contact application is executed, displays (for example, icons) for performing a direct connection function may be differently displayed according to communication counterparts.

Referring to FIGS. 13 and 14, when a contact application 1310 or 1410 is executed on a screen 1300 or 1400 of an electronic device, communication counterparts registered in the contact list of the electronic device may be displayed as AAA (1311a or 1411a), BBB (1311b or 1411b), CCC (1311c or 1411c), DDD (1311d or 1411d), EEE (1311e or 1411e), and FFF (1311f or 1411f). According to various embodiments of the present disclosure, as illustrated in FIGS. 13 and 14, telephone call icons, instant messenger icons, text message icons, and e-mail icons may be displayed as communication application related information for the respective communication counterparts.

For example, in FIG. 13, telephone call icons 1312a, 1312b, and 1312e may be displayed on regions where the communication application related information is displayed for AAA (1311a), BBB (1311b), and EEE (1311e) which are communication counterparts to whom a call may be made. Instant messenger icons 1312c and 1312f may be displayed on regions where communication application related information is displayed for CCC (1311c) and FFF (1311f0 which are communication counterparts with whom an instant messenger can be executed. An e-mail icon 1312d may be displayed on a region where communication application related information is displayed for DDD (1311d) which is a communication counterpart with whom connection via e-mail is possible.

According to various embodiments of the present disclosure, electronic devices may be distinguished from each other by displaying the icons in different colors. For example, an icon having a green background may denote a cell phone, an icon having a blue background may denote a tablet PC, and an icon having a yellow background may denote a home phone. Among one or more electronic devices of a counterpart, the counterpart's electronic device displayed in a user's electronic device may be displayed using characteristics (color and image) of an icon according to the user's priority or the counterpart's priority.

Referring to FIG. 13, for AAA (1311a), a cell phone and a telephone application may be determined as a connectable electronic device and a communication application, respectively, and may be displayed as a telephone call icon 1312a having a green background. For BBB (1311b), a home phone and a telephone application may be determined as a connectable electronic device and a communication application, respectively, and may be displayed as a telephone-shaped icon 1312b having a yellow background. For CCC (1311c), a cell phone and an instant messenger application may be determined as a connectable electronic device and a communication application, respectively, and may be displayed as an instant messenger icon 1312c having a green background.

For DDD (1311d), a tablet PC and an e-mail application may be determined as a connectable electronic device and a communication application, respectively, and may be displayed as an e-mail icon 1312d having a blue background. For EEE (1311e), a cell phone and a telephone call application may be determined as a connectable electronic device and a communication application, respectively, and may be displayed as a telephone icon 1312e having a green background. For FFF (1311f0, a tablet PC and an instant messenger application may be determined as a connectable electronic device and a communication application, respectively, and may be displayed as an instant messenger icon 1312f having a blue background.

According to another embodiment of the present disclosure, when the electronic device displays a contact list, the electronic device may also display an icon for initiating a communication session with a respective counterpart. In some implementations, the icon may identify a contactable electronic device and a contactable communication application may be complexly displayed as illustrated in FIG. 14.

Referring to FIG. 14, for AAA (1411a), a cell phone and a telephone application may be determined as a connectable electronic device and a communication application, respectively, and a cell phone image 1412a and a telephone image 1413a may be displayed to at least partially overlap each other. For example, the telephone image 1413a may be displayed while being superposed on the cell phone image 1412a, and vice versa. Hereinafter, the same method may be applied to embodiments which will be described below. For BBB (1411b), a home phone and a telephone application may be determined as a connectable electronic device and a communication application, respectively, and a telephone-shaped image 1413b may be displayed while being superposed on a home phone image 1412b. For CCC (1411c), a cell phone and an instant messenger application may be determined as a connectable electronic device and a communication application, respectively, and an instant messenger image 1413c may be displayed while being superposed on a cell phone image 1412c.

For DDD (1411d), a tablet PC and an e-mail application may be determined as a connectable electronic device and a communication application, respectively, and an e-mail image 1413d may be displayed while being superposed on a table PC image 1412d. For EEE (1411e), a cell phone and a telephone call application may be determined as a connectable electronic device and a communication application, respectively, and a telephone image 1413e may be displayed while being superposed on a cell phone image 1412e. For FFF (1411f0, a tablet PC and an instant messenger application may be determined as a connectable electronic device and a communication application, respectively, and an instant messenger image 1413f may be displayed while being superposed on a tablet PC image 1412f.

According to various embodiments of the present disclosure, when a plurality of electronic devices have been registered for a communication counterpart, the operation of determining at least one communication means may be performed according to the user's priority or the counterpart's priority. In cases where a plurality of electronic devices have been registered, when the operation of determining the communication means is performed according to the user's priority, the communication means may be determined based on a profile associated with the user. For example, the profile may identify a preferred contact method, a preferred electronic device, and/or any other suitable type of information. For example, when the user prefers to communicate with counterpart AAA via telephone, the electronic device may raise the priority of an electronic device capable of making a call among electronic devices of the counterpart to display the same to the user as illustrated in FIG. 13 or 14.

According to various embodiments of the present disclosure, in the case where the plurality of electronic devices have been registered for the communication counterpart, when the operation of selecting one of those devices is performed according to the counterpart's priority, the communication means may be determined based on a profile associated with the counterpart. The profile may identify, for example, a currently used electronic device, a preferred electronic device, or a preferred contact method. For example, when counterpart BBB prefers to use a home phone as a communication means at home, the corresponding information may be transmitted to the user or a server.

According to various embodiments of the present disclosure, when counterpart CCC uses an instant messenger with a cell phone, a cell phone icon of user CCC and an instant messenger icon may be displayed to overlap each other in the contact of user CCC as illustrated in FIG. 14.

According to various embodiments of the present disclosure, the operation of setting communication means of the user and the communication counterpart may be performed based on a priority determined by the user or the communication counterpart. The user may acquire information on a communication means supported by one or more electronic devices of the communication counterpart to determine the priority. The priority may be determined by situation information of the user or the communication counterpart (for example, time, a place, movement or not, or a schedule), or may be determined by preference of the user or the communication counterpart (for example, a preferred communication means, a preferred electronic device, or a mental state).

According to various embodiments of the present disclosure, the user may determine or change the priority according to his/her intention.

Figure 15:
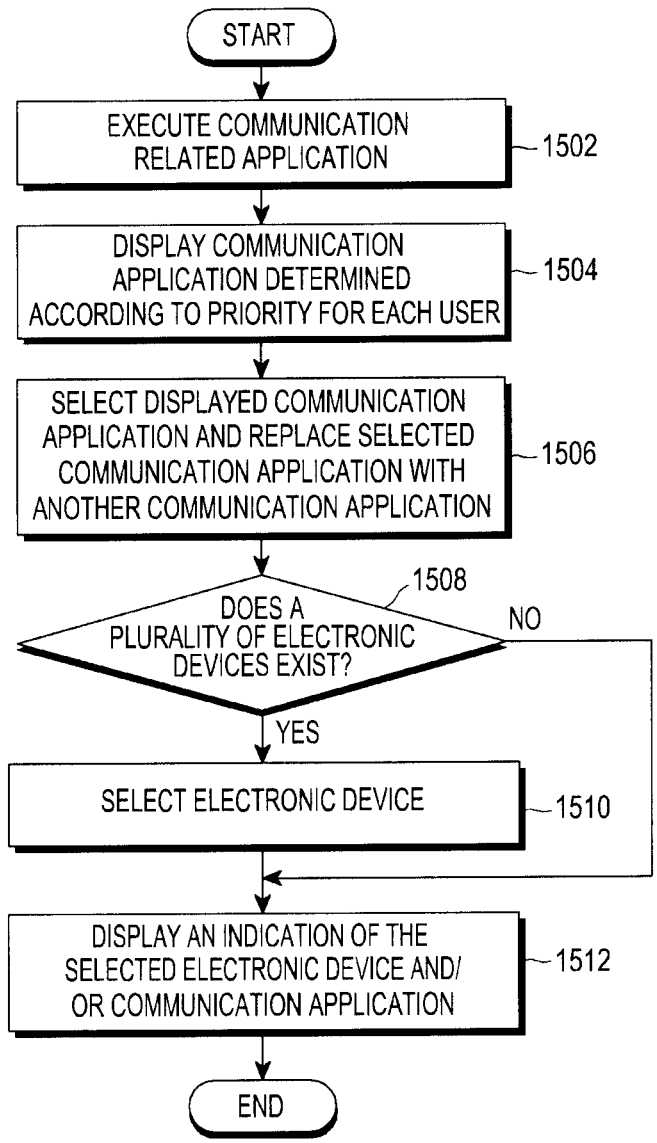
FIG. 15 is a flowchart illustrating a procedure of selecting an electronic device and a communication application for a communication counterpart according to various embodiments of the present disclosure.

FIG. 15 is a flowchart of an example of a process according to various embodiments of the present disclosure. Referring to FIG. 15, when a communication related application is executed in step 1502, at least one communication application determined according to a predetermined priority corresponding to each user (communication counterpart) may be displayed as communication related information, in step 1504. The displayed communication application may be selected, and the selected communication application may be replaced by another communication application, in step 1506.

When it is determined in step 1508 that a plurality of electronic devices exists, a particular electronic device may be selected in step 1510. In step 1512, an indication of the selected electronic device and/or communication application may be displayed.

According to various embodiments of the present disclosure, a method of changing an electronic device and/or a communication application may be implemented in a variety of ways.

For example, according to various embodiments of the present disclosure, a communication application is selected first, and when a plurality of electronic devices exists for the selected communication application, any one of the plurality of electronic devices may be additionally selected.

In addition, according to various embodiments of the present disclosure, an electronic device is selected first, and when a plurality of communication applications exists for the selected electronic device, any one of the plurality of communication applications may be additionally selected.

Furthermore, according to various embodiments of the present disclosure, a plurality of selectable electronic devices and a plurality of selectable applications are all displayed on a screen, and then a user may select a particular application of a particular electronic device at one time.

Figure 16:
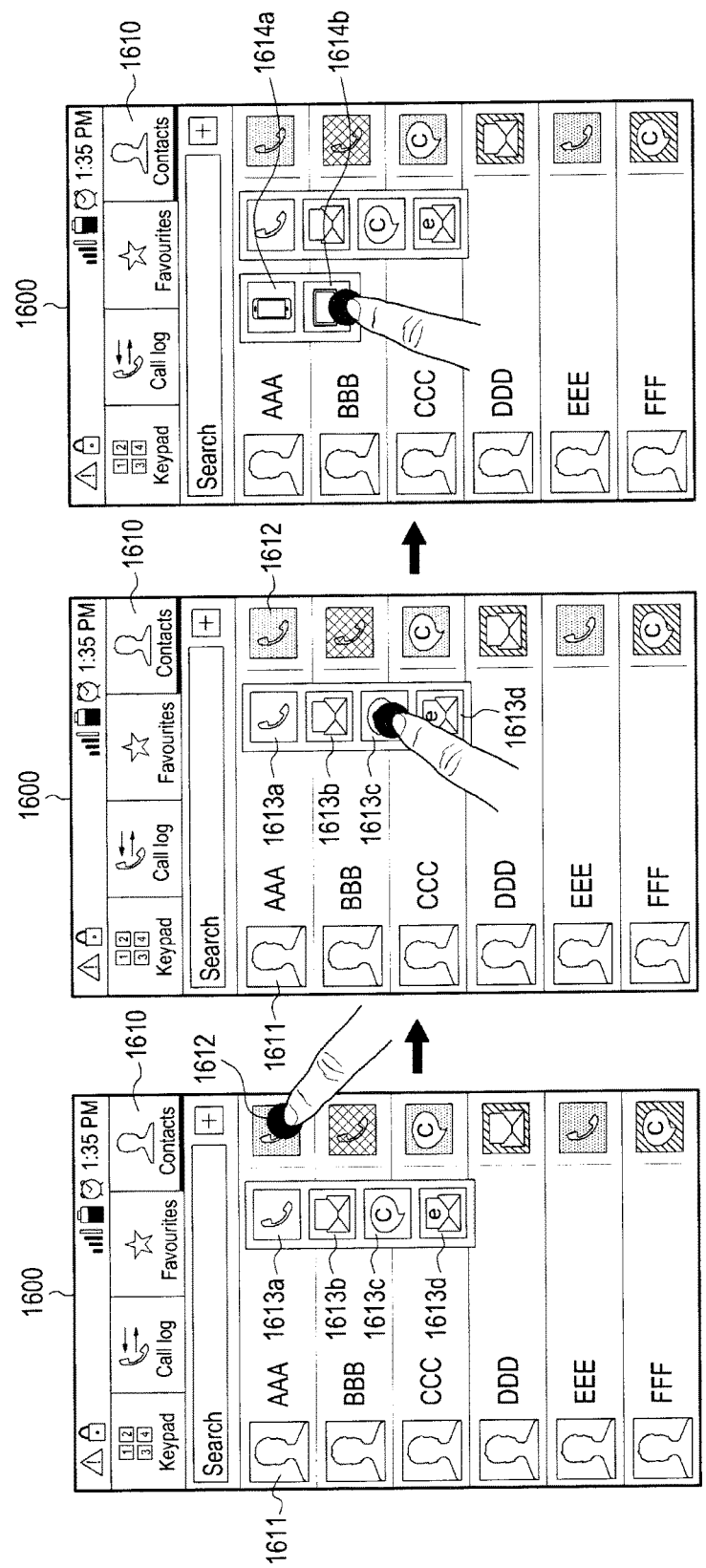
FIG. 16 is a diagram illustrating a screen for selecting an electronic device and a communication application for a communication counterpart according to various embodiments of the present disclosure.
Figure 17:
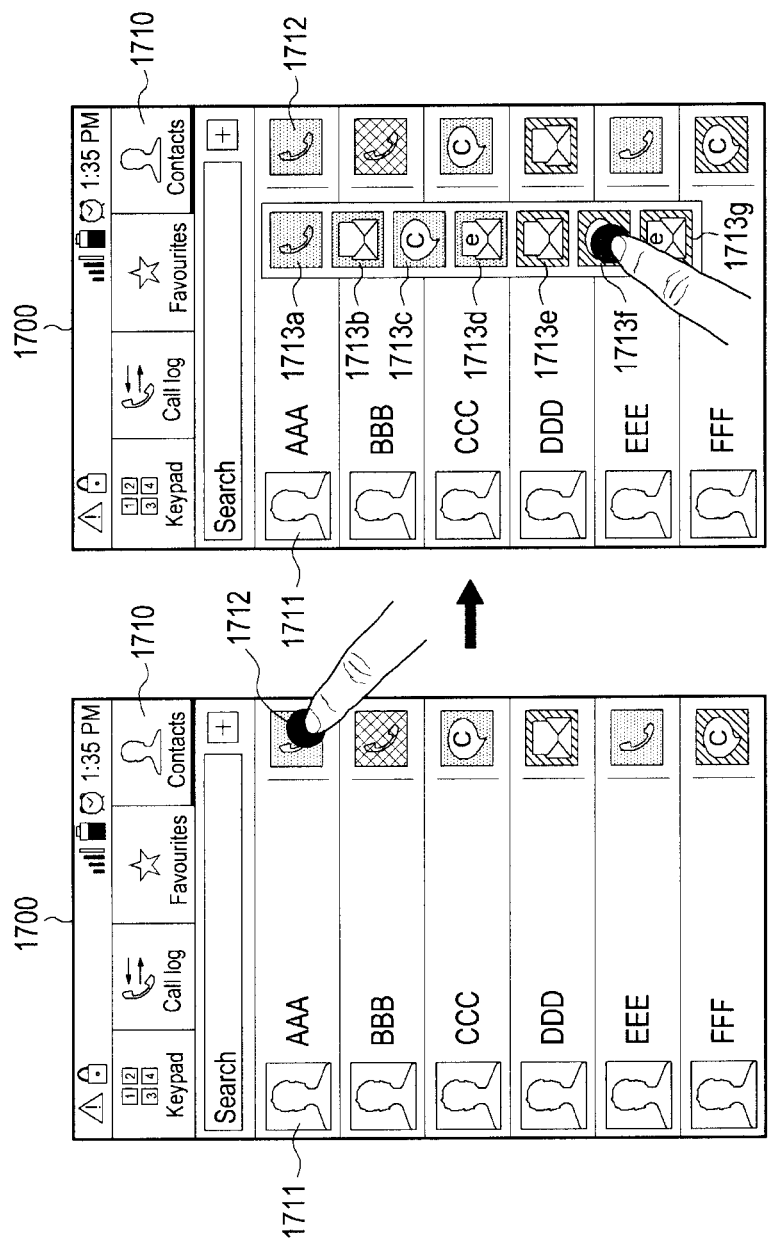
FIG. 17 is a diagram illustrating a screen for selecting an electronic device and a communication application for a communication counterpart according to various embodiments of the present disclosure.
Figure 18:
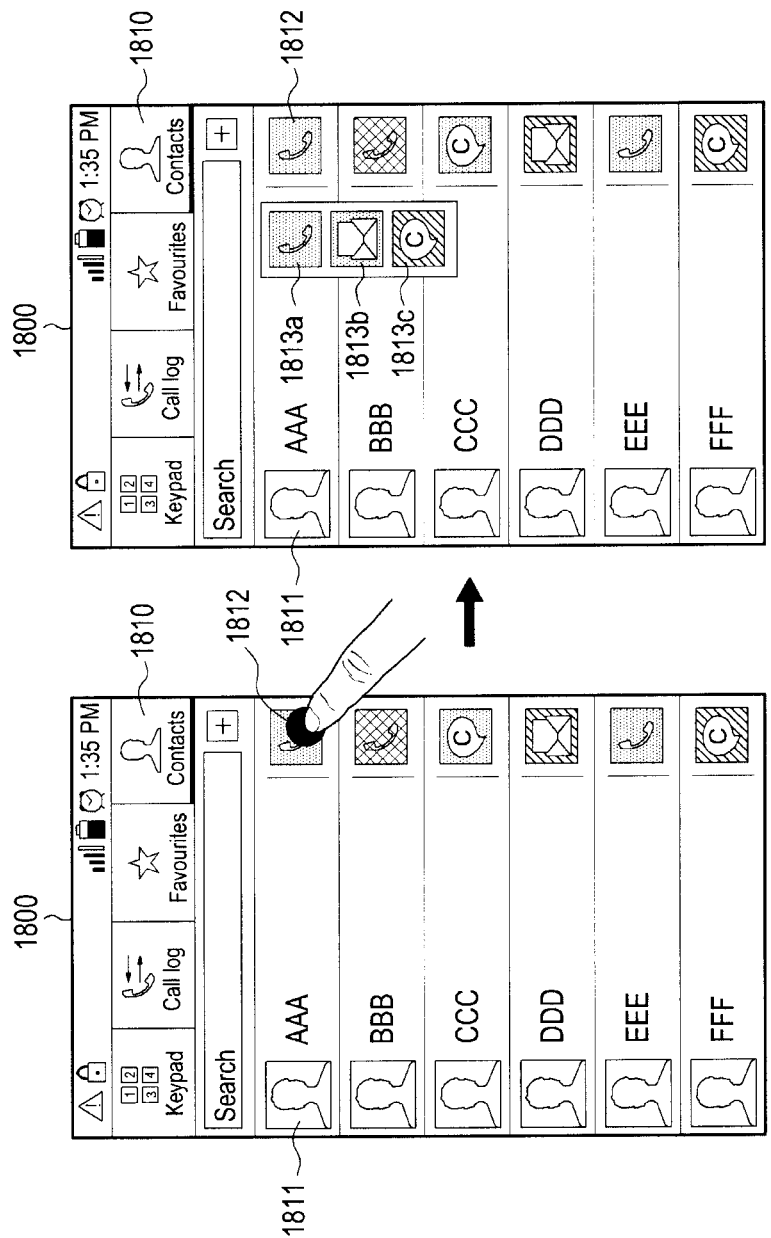
FIG. 18 is a diagram illustrating a screen for selecting an electronic device and a communication application for a communication counterpart according to various embodiments of the present disclosure.

FIGS. 16, 17, and 18 are diagrams illustrating screens for selecting an electronic device and a communication application for a communication counterpart according to various embodiments of the present disclosure.

Referring to FIGS. 16, 17, and 18, when a contact menu 1610, 1710, or 1810 is executed on a screen 1600, 1700, or 1800 of an electronic device, a plurality of communication counterparts stored in the contact list, including user AAA (1611, 1711, or 1811), may be displayed. In addition, according to various embodiments of the present disclosure, an available electronic device and/or communication means may be displayed in an image form of a different color for each communication counterpart. By way of example, for user AAA (1611), a cell phone and a telephone call application may be selected as a connectable electronic device and a communication application, respectively, and may be displayed as a telephone icon 1612 having a green background.

In FIG. 16, a user may change the communication means for communication counterpart AAA (1611) by selecting (for example, through a long press, a gesture, or an option key) the icon (for example, the telephone icon 1612 having a green background) which is being currently displayed for the communication counterpart AAA (1611). FIG. 16 illustrates an example of a sequence in which the user changes the communication means for communication counterpart AAA (1611) from a telephone call in a cell phone to an instant messenger in a tablet PC. For example, when the user selects the currently displayed telephone icon 1612 having a green background, a plurality of registered communication means 1613a, 1613b, 1613c, and 1613d may be displayed.

According to various embodiments of the present disclosure, as illustrated in FIG. 16, a preferred communication method may be selected first, and when one or more electronic devices supporting the corresponding communication method exist, one electronic device may be selected. In another example, the user may select a preferred electronic device and then select a preferred communication method.

For example, referring to FIG. 16, when the telephone icon 1612 having a green background which is displayed for communication counterpart AAA (1611) is selected, the icons for the plurality of available communication means (for example, the telephone icon 1613a, the e-mail icon 1613b, the instant messenger icon 1613c, and the e-mail icon 1613d) may be displayed.

When the instant messenger icon 1613c among the plurality of displayed communication means is selected, an icon (for example, a cell phone icon 1614a and a tablet PC icon 1614b) may be displayed as illustrated in FIG. 16 for at least one electronic device supporting an instant messenger application among electronic devices registered for communication counterpart AAA (1611).

When the user selects the tablet PC icon 1614*b* among the cell phone icon 1614*a* and the tablet PC icon 1614*b*, communication application related information, which corresponds to communication related information for the communication counterpart AAA (1611), may be changed from the telephone icon 1612 having a green background to an instant messenger icon having a blue background.

According to various embodiments of the present disclosure, the electronic device may display, to the user, all electronic devices that a counterpart has registered. Alternatively, the electronic device may display only those devices that are currently usable to reach the counterpart.

For example, as illustrated in FIG. 17, a telephone icon 1712 having a green background may be displayed as communication application related information for communication counterpart AAA (1711). According to various embodiments of the present disclosure, when the user selects the telephone icon 1712 having a green background, all communication means 1713*a*, 1713*b*, 1713*c*, 1713*d*, 1713*e*, 1713*f*, and 1713*g* may be displayed for all electronic devices registered for the communication counterpart AAA (1711). The user may select a particular communication application in any one electronic device (for example, the instant messenger icon 1713*f* in the tablet PC) among the displayed communication means 1713*a*, 1713*b*, 1713*c*, 1713*d*, 1713*e*, 1713*f*, and 1713*g* to change the electronic device and/or communication means.

In addition, according to various embodiments of the present disclosure, when the user selects a telephone icon 1812 having a green background as illustrated in FIG. 18, among all communication means for all electronic devices registered for communication counterpart AAA (1811), connectable communication means 1813*a*, 1813*b*, and 1813*c* may be displayed. The user may select a particular communication application (for example, the tablet instant messenger icon 1813*c*) among the displayed indications of communication applications 1813*a*, 1813*b*, and 1813*c* to replace the indication of communication application 1812.

For example, as illustrated in FIG. 17, in the method in which the user changes the communication means, set as the telephone call through a cell phone, to the tablet instant messenger for communication counterpart AAA (1711), the user may select the icon 1712 displayed for AAA (1711), while all the electronic devices and communication methods registered for AAA (1711) are being displayed at one time. In another example, as illustrated in FIG. 18, in displaying the electronic devices and communication methods registered for AAA (1811), only the electronic device and communication method which AAA (1811) can currently use may be displayed.

According to various embodiments of the present disclosure, after a communication means is determined according to the priority of a user or a communication counterpart, the electronic device may dynamically change the priority.

Figure 19:
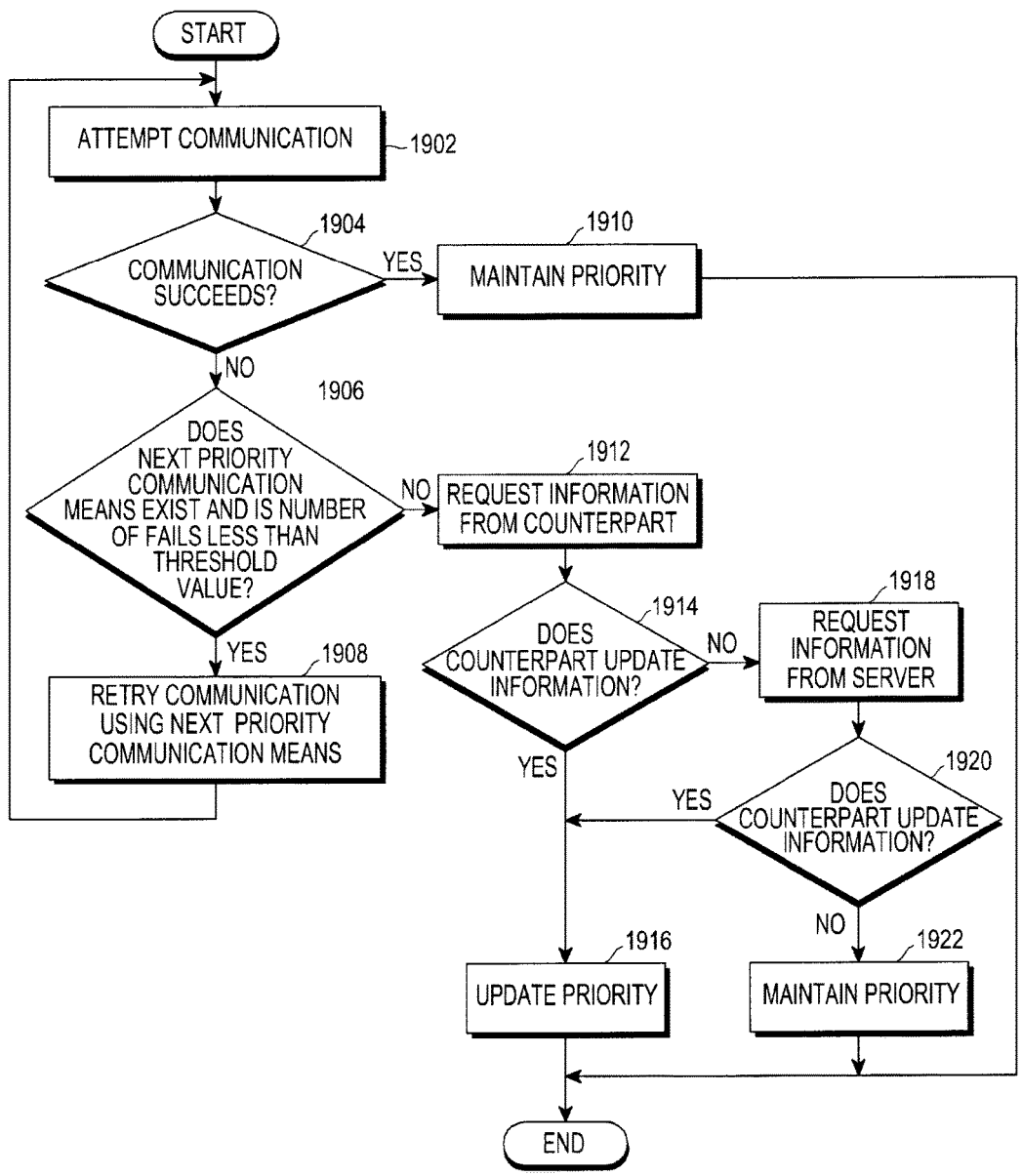
FIG. 19 is a flowchart of an example of a process according to various embodiments of the present disclosure.

FIG. 19 is a flowchart of an example of a process according to various embodiments of the present disclosure. Referring to FIG. 19, in step 1902, a user may communicate with a communication counterpart via a communication means that is selected according to a priority of the communication means. The communication means may include a device associated with the communication counterpart and/or a communication application that is capable of being used to contact the communication counterpart.

When it is determined in step 1904 that the communication has succeeded, an electronic device may maintain the current priority, in step 1910. When it is determined in step 1904 that the communication has failed, the electronic device may determine whether the next priority communication means exists or whether the number of fails is less than a threshold value. When the determination result shows that the next priority communication means exists and that the number of fails is less than the threshold value, the electronic device may retry communication using the next priority communication means, in step 1908.

When it is determined in step 1906 that the next priority communication means does not exist and the number of fails is greater than or equal to the threshold value, the electronic device may request information from a communication counterpart, in step 1912. For example, when it is determined in step 1906 that there is no means capable of attempting communication except for the means having failed in communication or communication failure is greater than the threshold value (for example, the number of fails, non-response for a predetermined period of time, or a previous failure history), the electronic device may request information for changing the priority (for example, a current situation, a schedule, or a preference change) from the communication counterpart, in step 1912.

When it is determined in step 1914 that the counterpart has updated the information, the electronic device may update the priority based on the updated information in step 1916. When the corresponding information is temporary or does not correspond to the user's priority, the electronic device may maintain the priority.

When it is determined in step 1914 that the counterpart does not respond to the request, the electronic device may request information from a server in step 1918. In cases where the counterpart has set information thereof in the server (for example, information registration or permission for the user's access to information) so that the counterpart's information can be updated in step 1920, the electronic device may acquire the information on the counterpart from the server. The electronic device may update the priority based on the information acquired from the server, in step 1916. For example, the Session Initiation Protocol (SIP) discovery technology may be used to receive the information on the communication counterpart from the server. When it is determined in step 1920 that the information has not been received from the server or the acquired information does not correspond to the user's priority or is the same as the current priority, the electronic device may maintain the priority in step 1922.

According to various embodiments of the present disclosure, the communication means displayed according to the priority of the user or counterpart may be changed through various methods.

Figure 20:
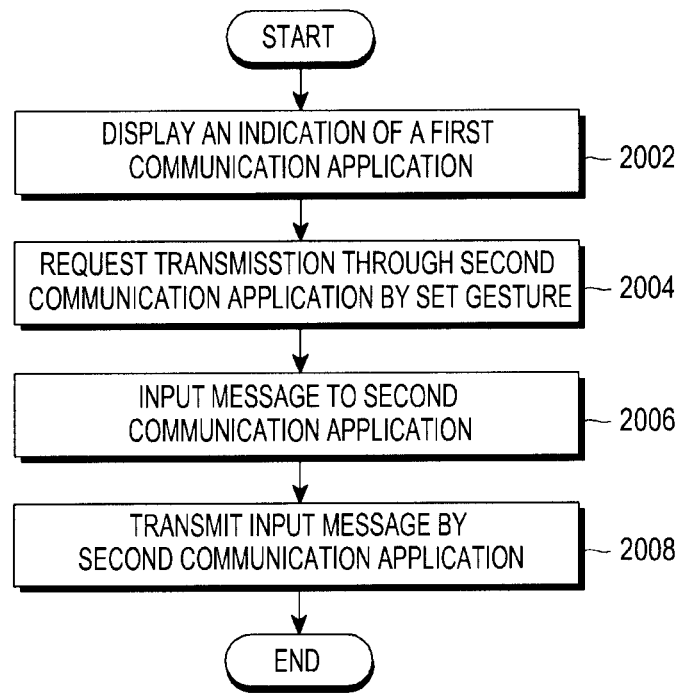
FIG. 20 is a flowchart of an example of a process according to various embodiments of the present disclosure.

FIG. 20 is a flowchart of an example of a process according to various embodiments of the present disclosure. Referring to FIG. 20, while a first communication application is displayed for a particular communication counterpart in step 2002, transmission through a second communication application may be requested by a preset gesture in step 2004. In step 2006, a message may be input to the second communication application according to the request, and in step 2008, the input message may be transmitted by the first communication application.

More specifically, among a user's communication related applications, a contact application may be executed, and information related to at least one communication application may be displayed as communication related information for each communication counterpart.

According to various embodiments of the present disclosure, while a text message transfer application is displayed for a particular communication counterpart, transmission through a voice transfer application may be requested by a preset gesture (for example, a drag from the right to the left). The user's voice may be recorded according to the request, and a text message including the recorded voice may be transmitted to the counterpart.

According to various embodiments of the present disclosure, even though a communication means is displayed as a text message transfer application, when a user wants to communicate according to his/her own free will but not using a communication means displayed depending upon the priority thereof, for example, when the user wants to perform communication through voice, when the user cannot currently input text (for example, while driving a vehicle or playing a game), or when the sender wants to express his/her emotion through voice, the above-described method may be provided in which the user can change a communication means in the electronic device.

According to various embodiments of the present disclosure, a communication application (for example, a text message application) set based on a communication counterpart's situation information may be replaced by a communication application corresponding to a user's situation (for example, a preferred means or a contactable means). For example, when the user wants to communicate through voice, the user may make a preset gesture to allow the electronic device to record the user's voice, and when the user's voice is completely recorded, a message (for example, a multimedia message or voice mail) having the recorded voice attached thereto may be transferred.

Figure 21:
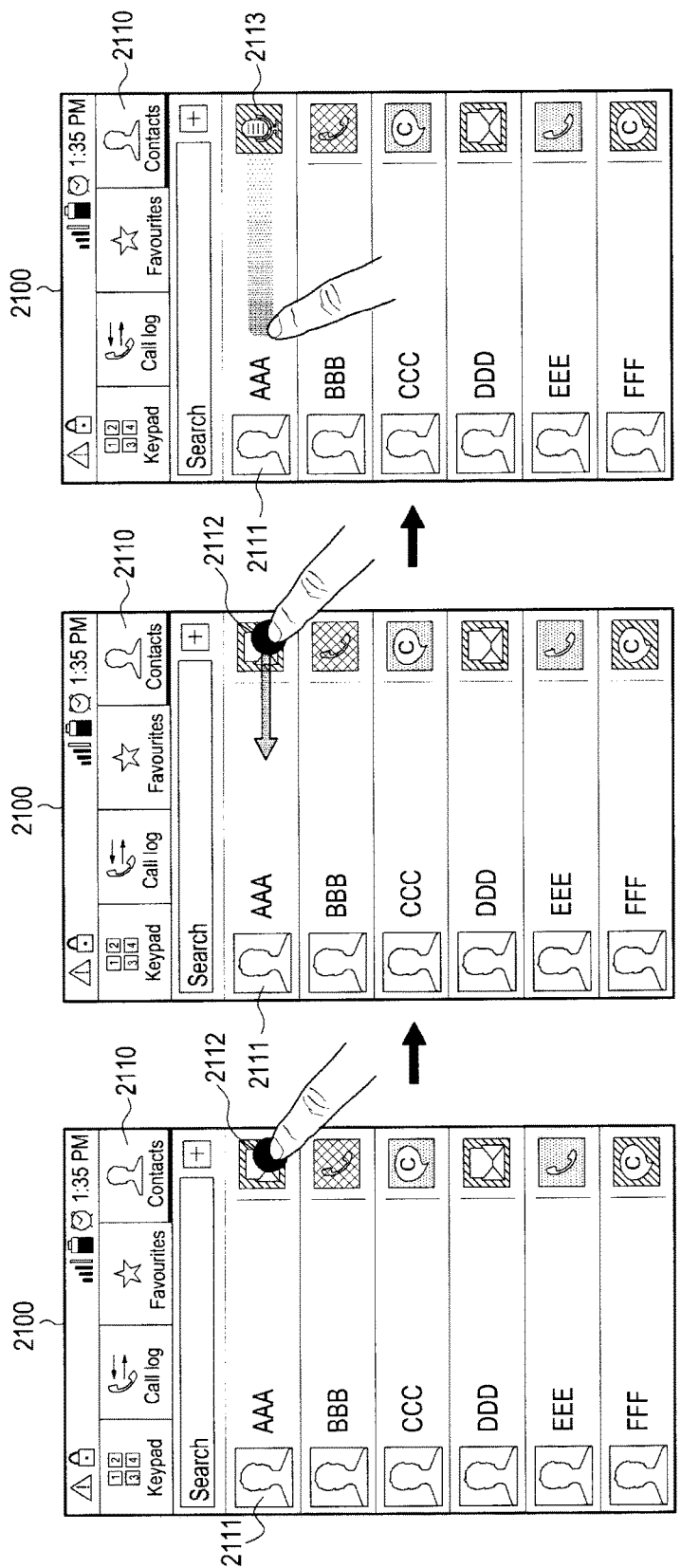
FIG. 21 is a diagram illustrating an execution screen of a message transfer application according to various embodiments of the present disclosure.

FIG. 21 illustrates an execution screen of a message transfer application according to various embodiments of the present disclosure. Referring to FIG. 21, when a contact menu 2110 is executed on a screen 2100 of an electronic device, a plurality of communication counterparts stored in the contact list, including user AAA (2111), may be displayed. In addition, according to various embodiments of the present disclosure, an available electronic device and/or communication means may be displayed in an image form of a different color for each communication counterpart. By way of example, for user AAA (2111), a tablet PC and a text message application may be determined as a connectable electronic device and a communication application, respectively, and may be displayed as a text message icon 2112 having a blue background.

According to various embodiments of the present disclosure, while a communication means determined by applying the priority for user AAA (2111) is displayed as a text message, if a user drags an icon in a set direction, the electronic device may be switched to a voice recording mode. An icon 2112 for the text message may be converted into an icon 2113 for a voice message. The user may attempt communication in a voice message form, and the recorded voice may be transferred in a text message form (for example, a multimedia message, voice mail, or STT) to the communication counterpart AAA (2111). When such a method is used, the user's electronic device may communicate with the communication counterpart using a communication means desired by the user, even without changing the priority of the communication means.

According to various embodiments of the present disclosure, the method of changing a communication means may also be used to perform group communication including at least two or more counterparts.

Figure 22:
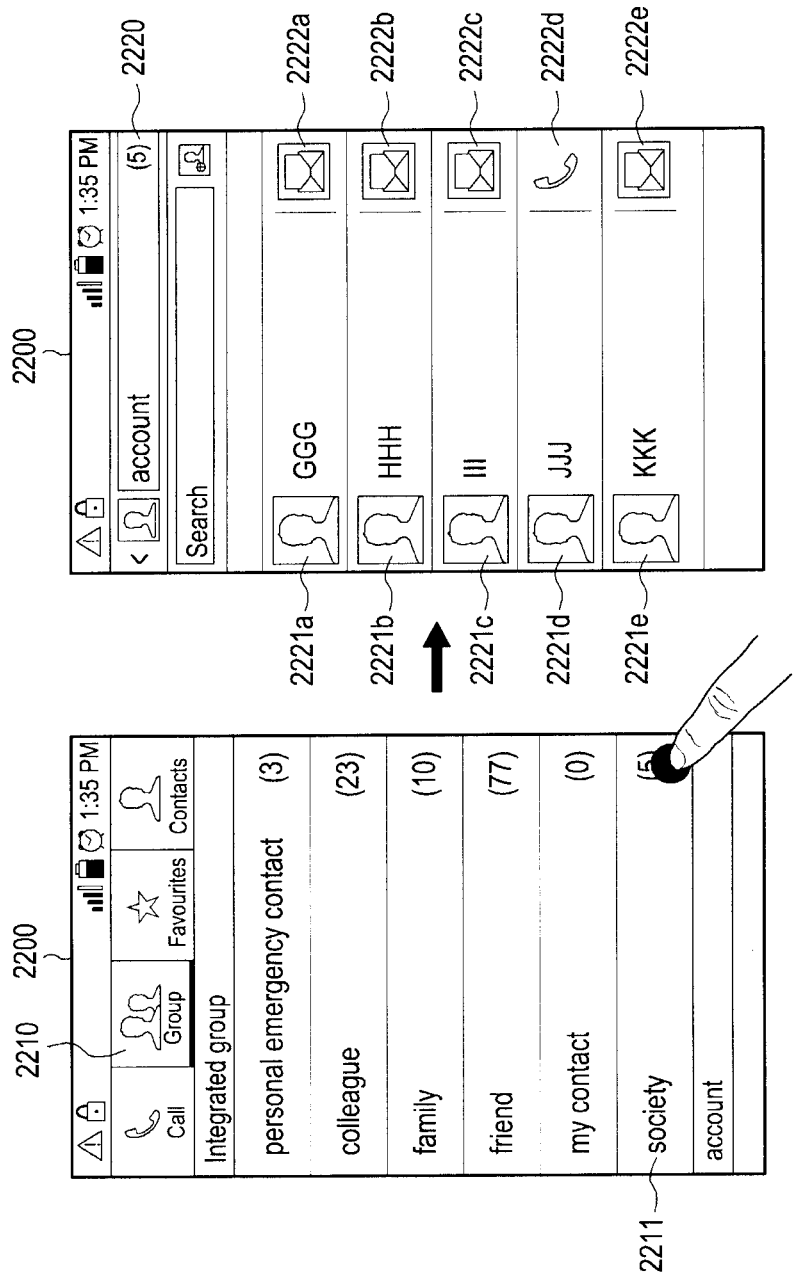
FIG. 22 is a diagram illustrating communication methods of individual users in a group according to various embodiments of the present disclosure.

FIG. 22 illustrates communication methods of individual users in a group according to various embodiments of the present disclosure. Referring to FIG. 22, when a group menu 2210 is executed on a screen 2200 of an electronic device, at least one group list set by a user may be displayed.

For example, as illustrated in FIG. 22, when the user selects a society group 221 to transmit a group message to the society group 2211 including five members, communication application related information 2222a, 2222b, 2222c, 2222d, and 2222e may be displayed for the five members 2221a, 2221b, 2221c, 2221d, and 2221e, respectively, according to various embodiments of the present disclosure.

When the user wants to transmit a text message (or a voice message) to the five members, member JJJ (2221d) may be in a state in which the message cannot be received (for example, a state in which the electronic device does not support the message or is in operation). According to various embodiments of the present disclosure, when the user writes a text message and transmit the text message to the five members, the text message (or voice message) transmitted by the user may be transmitted in the text message (or voice message) form to members GGG (2221a), HHH (2221b), III (2221c), and KKK (2221e) and in another form (for example, e-mail or Text To Speech (TTS)) to member JJJ (2221d).

Figure 23:
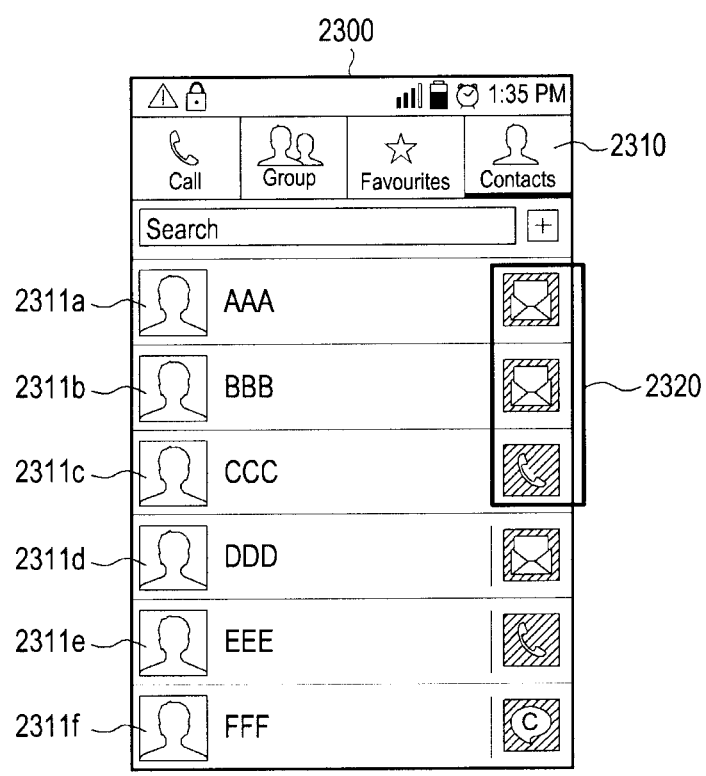
FIG. 23 is a diagram illustrating a communication method for a plurality of users according to various embodiments of the present disclosure.

FIG. 23 illustrates an example of creating a group message for counterparts that are not included in a group. Referring to FIG. 23, when a contact menu 2310 is executed on a screen 2300 of an electronic device, a plurality of communication counterparts 2311a, 2311b, 2311c, 2311d, 2311e, and 2311f stored in the contact list, including user AAA (2311a), may be displayed. In addition, according to various embodiments of the present disclosure, an available electronic device and/or communication means may be displayed in an image form of a different color for each communication counterpart.

According to various embodiments of the present disclosure, as illustrated in FIG. 23, when a user wants to simultaneously transmit a text message (or voice message) to the three communication counterparts AAA (2311a), BBB (2311b), and CCC (2311c), counterpart CCC (2311c) may be in a state in which the message cannot be received (for example, a state in which the electronic device does not support the message or is in operation). According to various embodiments of the present disclosure, when the user writes a text message and transmit the text message to the three communication counterparts, the text message (or voice message) transmitted by the user may be transmitted in the text message (or voice message) form to AAA (2311a) and BBB (2311b) and in another form (for example, e-mail or Text To Speech (TTS)) to CCC (2311c).

According to various embodiments of the present disclosure, when the user attempts communication with counterparts, the respective communication means for reaching each of the counterparts (e.g., an application capable of reaching the counterpart, and/or a message format) may be selected after the counterparts are selected, or the counterparts may be selected after the communication means is selected. For example, the counterparts may be added while a text message transfer application is executed.

Figure 24:
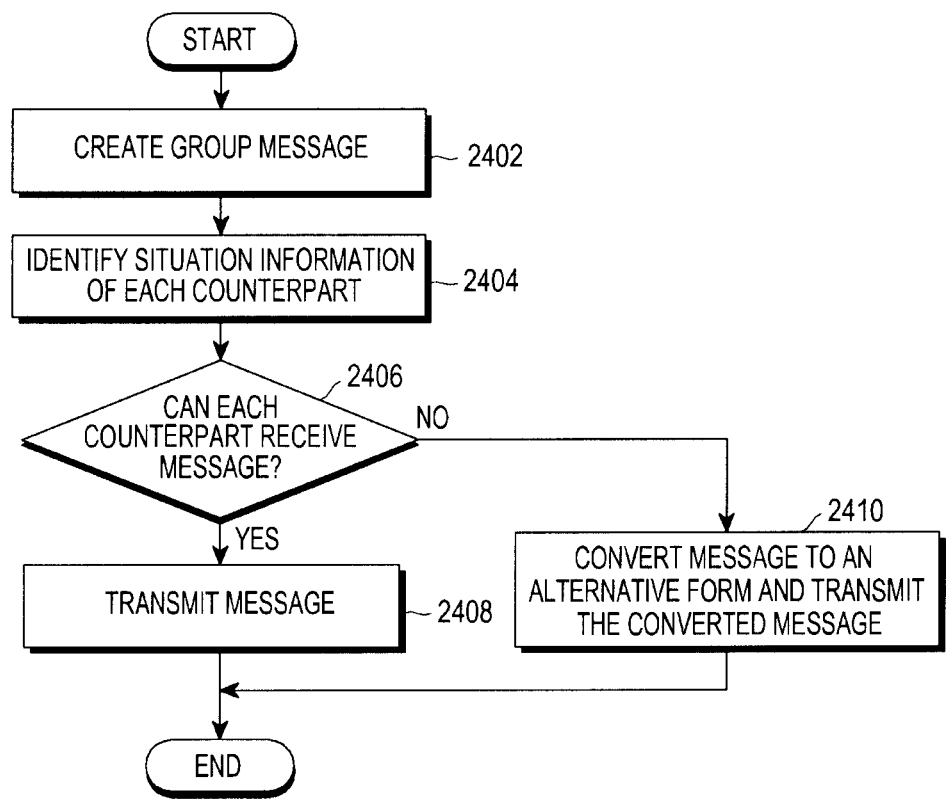
FIG. 24 is a flowchart of an example of a process according to various embodiments of the present disclosure.

FIG. 24 is a flowchart of an example of a process according to various embodiments of the present disclosure. Referring to FIG. 24, as it is requested in step 2402 to create a group message, an electronic device may identify situation information associated with each of the communication counterparts in the group, in step 2404.

In step 2406, based on the situation information, the electronic device may identify whether each communication counterpart can receive the message. In step 2408, the electronic device may transmit the message to the communication counterparts which can receive the message. In contrast, for the communication counterparts which cannot receive the message, the electronic device may convert the message to an alternative form (for example, an email message may be converted to a voice message by using Text To Speech (TTS)) and transmit the alternative means, in step 2410. Steps 2404 to 2410 of FIG. 24 may be separately executed for each individual counterpart in the group.

According to various embodiments of the present disclosure, changing a communication means may be performed in the user's electronic device, the counterpart's electronic device, or a server. For example, when the user's electronic device changes a communication means, the electronic device may compare the communication means selected by the user with the current situation information of a communication counterpart and then replace the communication means selected by the user with a means available for the communication counterpart to transmit the available means.

In another example, when the communication counterpart's electronic device changes a communication means, the counterpart's electronic device may change and process communication contents selected and transmitted by the user into a form corresponding to a communication application according to the current situation information of the counterpart. In another example, when the server changes a communication means, the server may change communication contents transmitted by the user into a form corresponding to a communication application according to a counterpart's situation information to transmit the changed contents.

Figure 25:
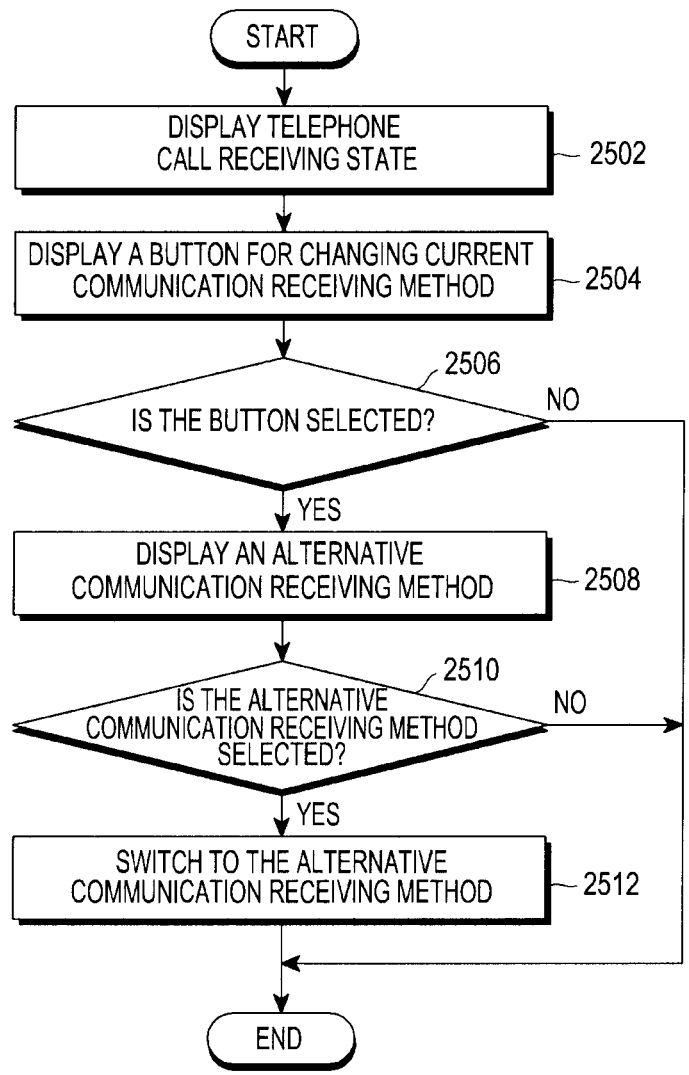
FIG. 25 is a flowchart of an example of a process according to various embodiments of the present disclosure.

FIG. 25 is a flowchart of according to various embodiments of the present disclosure. Referring to FIG. 25, when a telephone call is received from a counterpart, an electronic device may display a telephone call reception state on a screen thereof, in step 2502. The electronic device may display a button (and/or any other input component) a changing the current communication receiving method of the electronic device according to various embodiments of the present disclosure, in step 2504.

When a the button is selected in step 2506, the electronic device may display at least one alternative communication receiving method in step 2508. When an alternative communication receiving method is selected in step 2510, the current communication receiving method may be changed from the call receiving method to the selected alternative communication receiving method in step 2512.

According to various embodiments of the present disclosure, when a counterpart requests communication (for example, when a counterpart requests a telephone call), the electronic devices may provide an operation through which the user can select a communication method.

Figure 26:
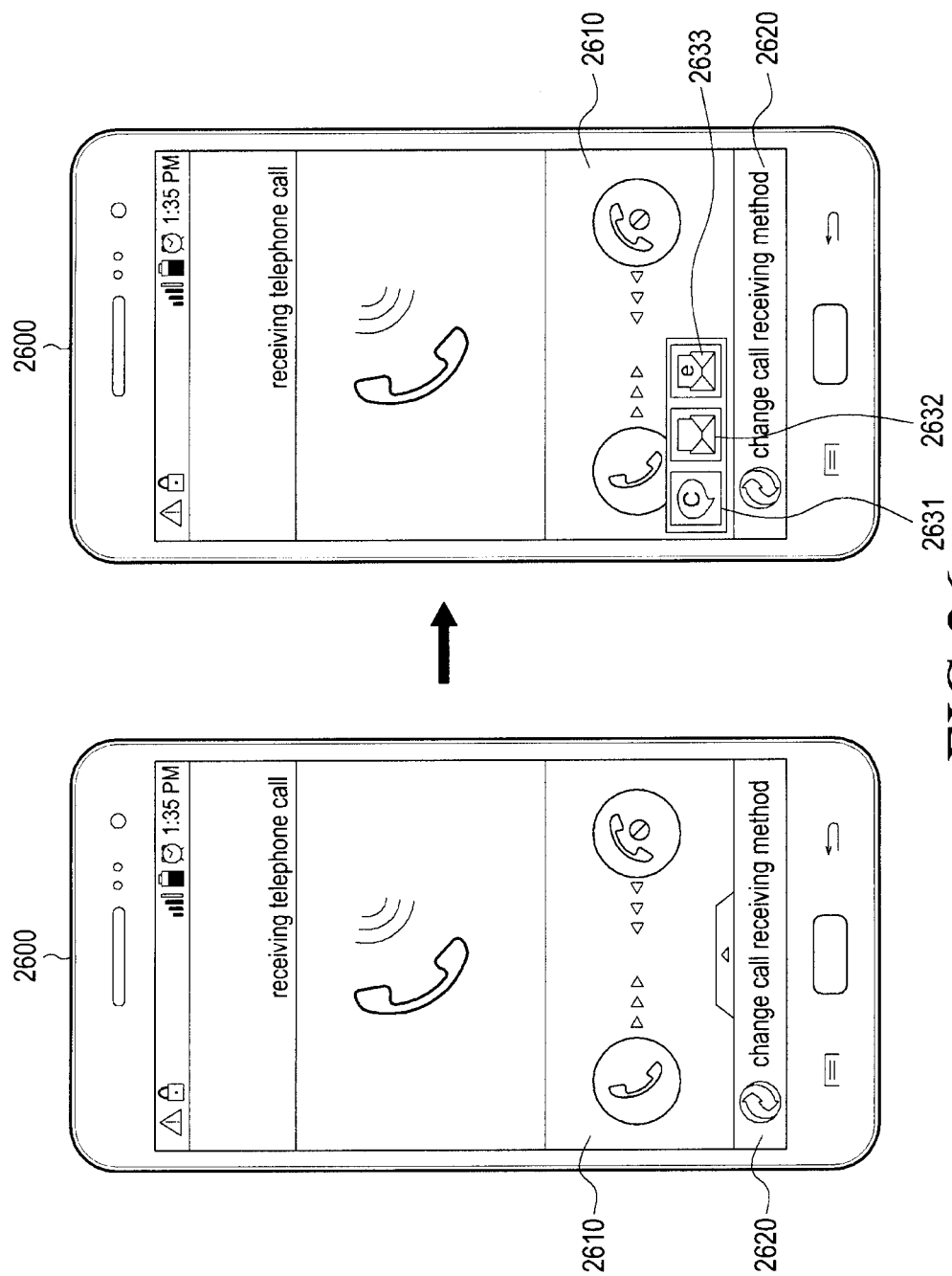
FIG. 26 is a diagram of a screen for changing a call receiving method according to various embodiments of the present disclosure.

For example, referring to FIG. 26, when a telephone call from a counterpart is received at an electronic device 2600, the electronic device 2600 may display, on a screen thereof, that the call is being received from the counterpart, as indicated by reference numeral 2610. In addition, according to an embodiment of the present disclosure, a an input element 2620 may be displayed in a predetermined region of the screen for changing a call receiving method.

For example, the user may change a communication means by performing a function (for example, icon selection, menu execution, or a gesture) of changing the call receiving method in view of his/her current state. The method for changing the communication means may be varied according to the priority of the user and the counterpart. For example, when the user sets the communication priority for the corresponding counterpart as an instant messenger, a change may be automatically made to the instant messenger.

In addition, when the input element 2620 is activated, alternative communication means 2631, 2632, and 2633 may be displayed. As illustrated in FIG. 26, while one or more alternative communication means 2631, 2632, and 2633 are being displayed, the user may select one communication means to replace the call receiving method.

When a communication means is changed according to a communication counterpart's priority, if the user changes the call receiving method, the communication means may be changed to the next priority communication means set by the communication counterpart, or while the communication means 2631, 2632 and 2633 which the counterpart can currently support are being displayed as illustrated in FIG. 26, the user may select one of the displayed communications means to change the communication means. The order of the currently supported communication means 2631, 2632, and 2633 may be dynamically changed according to the priority of the user or the communication counterpart.

When the user changes the communication means, a communication application capable of providing the corresponding communication means may be automatically executed. For example, when the user selects the Instant Messenger (IM) 2631, the instant messenger may be automatically executed.

Figure 27:
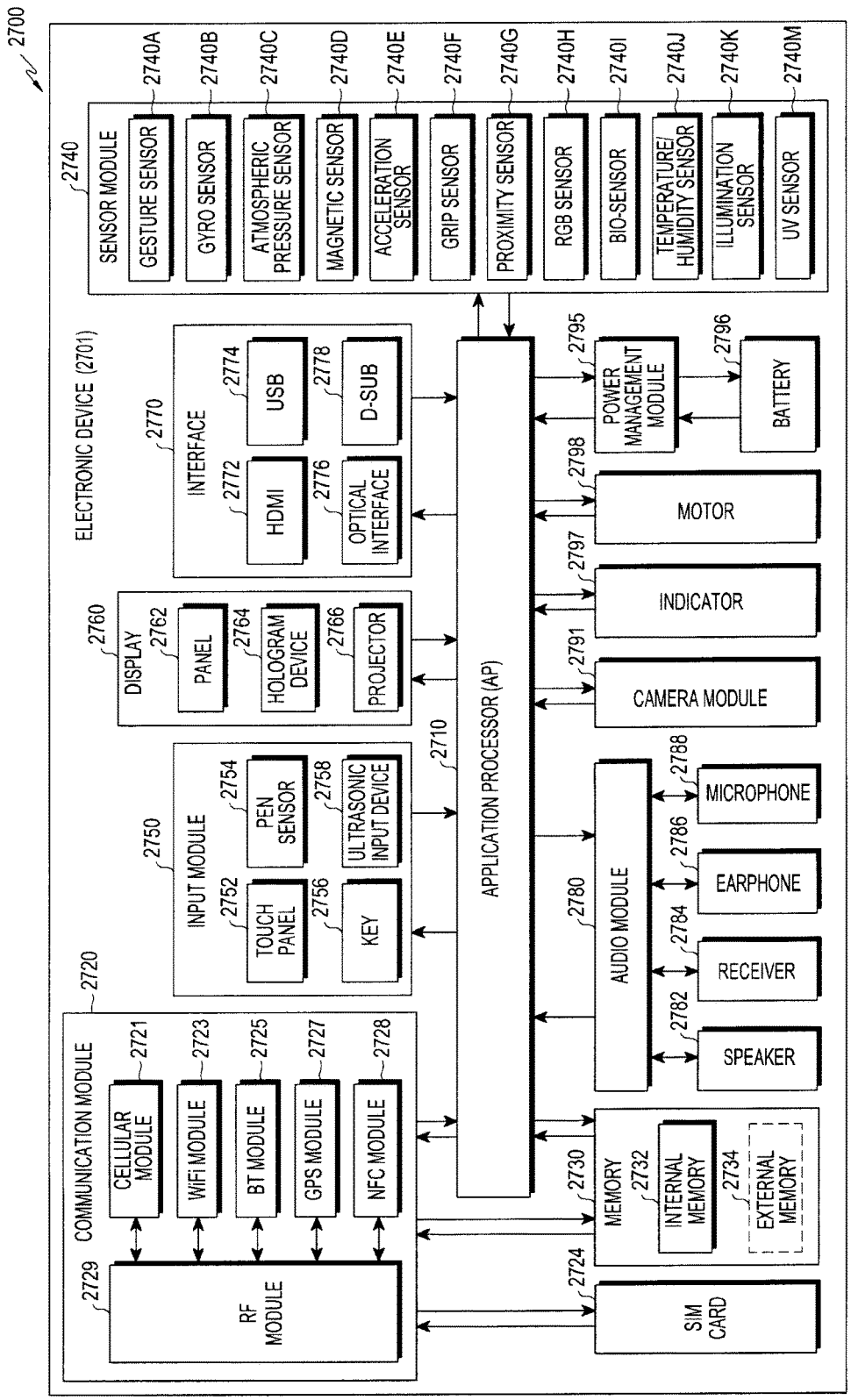
FIG. 27 is a block diagram illustrating a detailed structure of an electronic device according to an embodiment of the present disclosure.

FIG. 27 is a block diagram of an electronic device 2701 according to various embodiments of the present disclosure. The electronic device 2701 may include, for example, all or some of the electronic device 101 illustrated in FIG. 1. The electronic device 2701 may include at least one Application Processor (AP) 2710, a communication module 2720, a Subscriber Identification Module (SIM) card 2724, a memory 2730, a sensor module 2740, an input module 2750, a display 2760, an interface 2770, an audio module 2780, a camera module 2791, a power management module 2795, a battery 2796, an indicator 2797, and a motor 2798.

The AP 2710 may control a plurality of hardware or software components connected thereto by driving an operating system or an application program and perform a variety of data processing and calculations. The AP 2710 may be implemented by, for example, a System on Chip (SoC). According to one embodiment, the AP 2710 may further include a Graphic Processing Unit (GPU) and/or an image signal processor. The AP 2710 may also include at least some (for example, a cellular module 2721) of the elements illustrated in FIG. 27. The AP 2710 may load instructions or data, received from at least one other element (for example, a non-volatile memory), in a volatile memory to process the loaded instructions or data and may store various types of data in a non-volatile memory.

The communication module 2720 may have a configuration which is the same or similar to that of the communication interface 170 illustrated in FIG. 1. For example, the communication module 2720 may include a cellular module 2721, a Wi-Fi module 2723, a BT module 2725, a GPS module 2727, an NFC module 2728, and a Radio Frequency (RF) module 2729.

The cellular module 2721 may provide, for example, a voice call, a video call, a text message service, or an Internet service through a communication network. According to one embodiment, the cellular module 2721 may distinguish and authenticate the electronic device 2701 within a communication network using a subscriber identification module (for example, a SIM card 2724). According to one embodiment, the cellular module 2721 may perform at least some functions that the AP 2710 may provide. According to one embodiment, the cellular module 2721 may include a Communication Processor (CP).

The Wi-Fi module 2723, the BT module 2725, the GPS module 2727, and the NFC module 2728 may include, for example, a processor for processing data transmitted/received through the corresponding module. According to an embodiment, at least some (for example, two or more) of the cellular module 2721, the Wi-Fi module 2723, the BT module 2725, the GPS module 2727, and the NFC module 2728 may be included in one Integrated Chip (IC) or IC package.

The RF module 2729 may transmit/receive, for example, a communication signal (e.g., an RF signal). The RF module 2729 may include, for example, a transceiver, a Power Amp Module (PAM), a frequency filter, a Low Noise Amplifier (LNA), or an antenna. According to another embodiment, at least one of the cellular module 2721, the Wi-Fi module 2723, the BT module 2725, the GPS module 2727, and the NFC module 2728 may transmit/receive an RF signal through a separate RF module.

The SIM card 2724 may include, for example, a card including a subscriber identification module and/or an embedded SIM, and may further include unique identification information (for example, an Integrated Circuit Card Identifier (ICCID)) or subscriber information (for example, International Mobile Subscriber Identity (IMSI)).

The memory 2730 may include, for example, an internal memory 2732 or an external memory 2734. The internal memory 2732 may include at least one of a volatile memory (for example, a Dynamic Random Access Memory (DRAM), a Static RAM (SRAM), a Synchronous Dynamic RAM (SDRAM), and the like) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (for example, a NAND flash memory or a NOR flash memory), a hard disc drive, a Solid State Drive (SSD), and the like).

The external memory 2734 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 2734 may be functionally and/or physically connected to the electronic device 2701 through various interfaces.

The sensor module 2740 may measure a physical quantity or detect an operating state of the electronic device 2701 to convert the measured or detected information to an electronic signal. The sensor module 2740 may include, for example, at least one of a gesture sensor 2740A, a gyro sensor 2740B, an atmospheric pressure sensor 2740C, a magnetic sensor 2740D, an acceleration sensor 2740E, a grip sensor 2740F, a proximity sensor 2740G, a color sensor 2740H (e.g., a Red, Green, Blue (RGB) sensor), a biometric sensor 24701, a temperature/humidity sensor 2740J, an illumination sensor 2740K, and a ultraviolet (UV) sensor 2740M. Additionally or alternatively, the sensor module 2740 may include, for example, an E-nose sensor, an electromyography (EMG) sensor, an electroencephalogram (EEG) sensor, an electrocardiogram (ECG) sensor, an infrared (IR) sensor, an iris scanner, and/or a fingerprint sensor. The sensor module 2740 may further include a control circuit for controlling one or more sensors included therein. In an embodiment, the electronic device 2701 may further include a processor that is configured as a part of the AP 2710 or a separate element from the AP 2710 to control the sensor module 2740, thereby controlling the sensor module 2740 while the AP 2710 is in a sleep state.

The input device 2750 may include, for example, a touch panel 2752, a (digital) pen sensor 2754, a key 2756, or an ultrasonic input device 2758. The touch panel 2752 may use at least one of, for example, a capacitive type, a resistive type, an infrared type, and an ultrasonic type. In addition, the touch panel 2752 may further include a control circuit. The touch panel 2752 may further include a tactile layer to provide a tactile reaction to a user.

For example, the (digital) pen sensor 2754 may be a part of the touch panel or may include a separate recognition sheet. The key 2756 may include, for example, a physical button, an optical key, or a keypad. The ultrasonic input unit 2758 may identify data by detecting an acoustic wave with a microphone (for example, microphone 2788) of the electronic device 2701 through an input unit for generating an ultrasonic signal.

The display 2760 (for example, the display 160) may include a panel 2762, a hologram device 2764, or a projector 2766. The panel 2762 may include the same or similar configuration to the display 160 illustrated in FIG. 1. The panel 2762 may be implemented to be, for example, flexible, transparent, or wearable. The panel 2762 may be configured as one module together with the touch panel 2752. The hologram device 2764 may show a stereoscopic image in the air using interference of light. The projector 2766 may project light onto a screen to display an image. The screen may be located, for example, inside or outside the electronic device 2701. According to one embodiment, the display 2760 may further include a control circuit for controlling the panel 2762, the hologram unit 2764, or the projector 2766.

The interface 2770 may include, for example, a High-Definition Multimedia Interface (HDMI) 2772, a Universal Serial Bus (USB) 2774, an optical interface 2776, or a D-subminiature (D-sub) 2778. The interface 2770 may be included in, for example, the communication interface 170 illustrated in FIG. 1. Additionally or alternatively, the interface 2770 may include, for example, a Mobile High-definition Link (MHL) interface, a Secure Digital (SD) card/Multi-Media Card (MMC) interface, or an Infrared Data Association (IrDA) standard interface.

For example, the audio module 2780 may bilaterally convert a sound and an electronic signal. At least some elements of the audio module 2780 may be included, for example, in the input/output interface 150 illustrated in FIG. 1. The audio module 2780 may process voice information input or output through, for example, a speaker 2782, a receiver 2784, earphones 2786, the microphone 2788 or the like.

The camera module 2791 may capture, for example, a still image or a moving image, and according to one embodiment, may include one or more image sensors (for example, a front sensor or a rear sensor), a lens, an Image Signal Processor (ISP), or a flash (for example, an LED or a xenon lamp).

The power management module 2795 may manage, for example, power of the electronic device 2701. According to one embodiment, the power management module 2795 may include a Power Management Integrated Circuit (PMIC), a charger Integrated Circuit (IC), or a battery or fuel gauge. The PMIC may have a wired and/or wireless charging method. A magnetic resonance type, a magnetic induction type, or an electromagnetic type may be exemplified as the wireless charging method, and an additional circuit for wireless charging, such as a coil loop circuit, a resonance circuit, a rectifier circuit, and the like may be further included. The battery fuel gauge may measure, for example, the remaining amount of battery 2796, a charging voltage and current, or temperature. The battery 2796 may include, for example, a rechargeable battery or a solar battery.

The indicator 2797 may indicate particular status of the electronic device 2701 or a part thereof (for example, the AP 2710), for example, a booting status, a message status, a charging status, or the like. The motor 2798 may convert an electric signal into mechanical vibration and generate a vibration or haptic effect. Although not illustrated, the electronic device 2701 may include a processing unit (for example, a GPU) for supporting mobile TV. The processing unit for supporting the mobile TV may process media data according to a standard such as Digital Multimedia Broadcasting (DMB), Digital Video Broadcasting (DVB), media flow, or the like.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be coupled to form a single entity while performing the same functions as those of the corresponding elements before the coupling.

Figure 28:
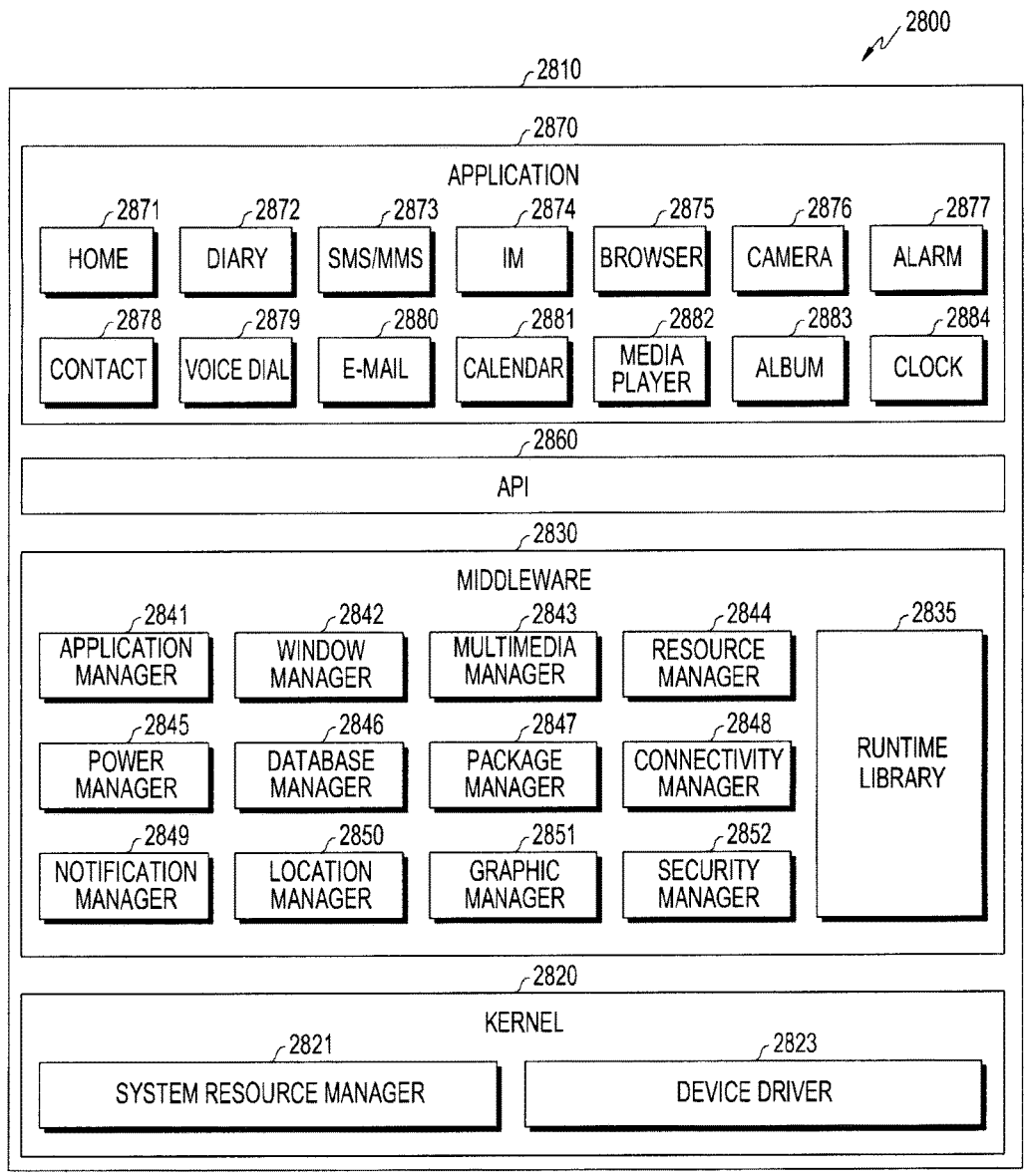
FIG. 28 is a block diagram of a programming module according to various embodiments of the present disclosure.

FIG. 28 is a block diagram 2800 of a program module 2810 according to various embodiments of the present disclosure. According to one embodiment, the program module 2810 (for example, the program 140) may include an operating system for controlling resources related to an electronic device (for example, the electronic device 101) and/or various applications (for example, the application programs 147) driven on the operating system. The operating system may be, for example, Android, iOS, Windows, Symbian, Tizen, Bada, or the like.

The program module 2810 may include a kernel 2820, a middleware 2830, an Application Programming Interface (API) 2860, or applications 2870. At least a part of the program module 2810 may be preloaded in the electronic device or may be downloaded from a server (for example, the server 106).

The kernel 2820 (for example, the kernel 141 of FIG. 1) may include, for example, a system resource manager 2821 or a device driver 2823. The system resource manager 2821 may perform the control, allotment, or collection of the system resources. According to one embodiment, the system resource manager 2821 may include a process management unit, a memory management unit, or a file system management unit. The device driver 2823 may include, for example, a display driver, a camera driver, a Bluetooth driver, a shared-memory driver, a USB driver, a keypad driver, a Wi-Fi driver, an audio driver, or an Inter-Process Communication (IPC) driver.

For example, the middleware 2830 may provide functions commonly required by the applications 2870 or provide various functions to the applications 2870 through the API 2860 such that the applications 2870 can efficiently use the restricted system resources in the electronic device. According to one embodiment, the middleware 2830 (e.g., the middleware 143) may include at least one of a runtime library 2835, an application manager 2841, a window manager 2842, a multimedia manager 2843, a resource manager 2844, a power manager 2845, a database manager 2846, a package manager 2847, a connectivity manager 2848, a notification manager 2849, a location manager 2850, a graphic manager 2851, or a security manager 2852.

The run time library 2835 may include, for example, a library module that a compiler uses in order to add new functions through a programming language while the applications 2870 are executed. The run time library 2835 may perform input/output management, memory management, or a function for an arithmetic function.

For example, the application manager 2841 may manage a life cycle of at least one of the applications 2870. The window manager 2842 may manage GUI resources used on the screen. The multimedia manager 2843 may detect a format required for reproducing various media files and encode or decode a media file using a codec appropriate for the corresponding format. The resource manager 2844 may manage resources, such as a source code, a memory, or a storage space, of at least one of the applications 2870.

The power manager 2845 may operate together with a Basic Input/Output System (BIOS) to manage a battery or power and may provide power information required for the operation of the electronic device. The database manager 2846 may create, search, or change a database that will be used by at least one of the applications 2870. The package manager 2847 may manage the installation or the updating of applications distributed in a package file form.

For example, the connectivity manager 2848 may manage wireless connections, such as Wi-Fi or Bluetooth. The notification manager 2849 may display or notify an event, such as a received message, an appointment, and a proximity notification, to a user without disturbance. The location manager 2850 may manage location information of the electronic device. The graphic manager 2851 may manage graphic effects to be provided to a user and user interfaces related to the graphic effects. The security manager 2852 may provide various security functions required for system security or user authentication. According to one embodiment, when the electronic device (for example, the electronic device 101) has a telephone call function, the middleware 2830 may further include a telephony manager for managing a voice or video call function of the electronic device.

The middleware 2830 may a middleware module for forming a combination of various functions of the aforementioned elements. The middleware 2830 may provide modules specialized according to types of operating systems in order to provide differentiated functions. In addition, the middleware 2830 may dynamically remove some of the existing elements or add new elements.

The API 2860 (for example, the API 145), which is a set of API programming functions, may include different configurations according to operating systems. For example, for Android or iOS, one API set may be provided to each platform, and for Tizen, two or more API sets may be provided to each platform.

The applications 2870 (for example, the applications 147) may include one or more of a home application 2871, a diary application 2872, an SMS/MMS application 2873, an Instant Message (IM) application 2874, a browser application 2875, a camera application 2876, an alarm application 2877, a contact application 2878, a voice dial application 2879, and e-mail application 2880, a calendar application 2881, a media player application 2882, an album application 2883, a clock application 2884, a health care application (for example, an application for measuring a work rate or blood sugar), and an environmental information application (for example, an application for providing atmospheric pressure, humidity, or temperature information).

According to one embodiment, the applications 2870 may include an application (hereinafter, referred to as "an information exchange application" for convenience of description) for supporting information exchange between the electronic device (for example, the electronic device 101) and an external electronic device (for example, the electronic device 102 or 104). The information exchange application may include, for example, a notification relay application for transferring particular information to the external electronic device or a device management application for managing the external electronic device.

For example, the notification relay application may include a function of transferring, to the external electronic device (for example, the electronic device 102 or 104), notification information generated from the other applications of the electronic device (for example, the SMS/MMS application, the e-mail application, the health management application, and the environmental information application). In addition, the notification relay application may receive notification information from the external electronic device and provide the received notification information to a user. For example, the device management application may manage (for example, install, delete, or update) at least one function of the external electronic device (for example, the electronic device 104) communicating with the electronic device (for example, a function of turning on/off the external electronic device itself (or some components) or a function of adjusting luminance (or a resolution) of the display), applications operating in the external electronic device, or services provided by the external electronic device (e.g., a call service and a message service).

According to one embodiment, the applications 2870 may include an application (for example, a health care application) designated depending upon an attribute (for example, as an attribute of an electronic device, the type of electronic device is a mobile medical appliance) of the external electronic device (e.g., the electronic device 102 or 104). According to one embodiment, the applications 2870 may include an application received from the external electronic device (for example, the server 106 or the electronic device 102 or 104). According to one embodiment, the applications 2870 may include a preloaded application or a third party application that can be downloaded from a server. The names of the elements of the program module 2810 according to the embodiment illustrated in FIG. 28 may vary according to the type of operating system.

According to various embodiments, at least a part of the programming module 2810 may be implemented in software, firmware, hardware, or a combination of two or more thereof. At least a portion of the programming module 2810 may, for example, be implemented (e.g., executed) by a processor (e.g., the AP 2710). At least some of the programming module 2810 may include, for example, a module, a program, a routine, sets of instructions, or a process for performing one or more functions.

The term "module" or "functional unit" used herein may, for example, mean a unit including one of hardware, software, and firmware or a combination of two or more of them. The "module" may be interchangeably used with, for example, the term "unit", "logic", "logical block", "component", or "circuit". The "module" or "functional unit" may be a minimum unit or a part of an integrally formed component. The "module" may be a minimum unit for performing one or more functions or a part thereof. The "module" or "function unit" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When he command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

According to various embodiments, in a storage medium storing instructions, the instructions, when executed by at least one processor, are set to allow the at least one processor to perform at least one operation. The at least one operation includes an operation of executing a communication related application in an electronic device and an operation of displaying communication related information for at least one communication counterpart according to the execution of the communication related application. The communication related information may include information related to at least one communication application satisfying a preset condition among a plurality of communication applications registered for each communication counterpart.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

FIGS. 1-24 are provided as an example only. At least some of the steps discussed with respect to these figures can be performed concurrently, performed in a different order, and/or altogether omitted. The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While the present disclosure has been particularly shown and described with reference to the examples provided therein, it will be understood by those skilled in the art that various changes in form and details may be made therein without departing from the spirit and scope of the present disclosure as defined by the appended claims.

What is claimed is:

1. An electronic device, comprising:
  a memory storing data related to a plurality of communication applications and information on a contact list;
  a display unit; and
  a processor operatively coupled to the display unit, configured to:
  acquire, for a communication counterpart in the contact list, situation information of the communication counterpart from the communication counterpart's electronic device or an external server collecting information on a plurality of users including the communication counterpart,
  detect a request for displaying the contact list, and
  in response to the request for displaying the contact list, display, for the communication counterpart in the contact list, a representation corresponding to a specific communication application from among the plurality of communication applications, based on the situation information of the communication counterpart,
  wherein the situation information includes one of a location of the communication counterpart and a schedule of the communication counterpart.

2. The electronic device of claim 1, the processor further configured to:
  identify, for the communication counterpart in the contact list, the specific communication application from among the plurality of communication applications, based on whether the situation information of the communication counterpart satisfies a preset condition
  in response to detecting a first input selecting the representation of the specific communication application, display a menu proximate to the representation listing other applications of the plurality of communication applications selectable to contact the communication counterpart.

3. The electronic device of claim 1, wherein the situation information comprises at least one of: location information of the communication counterpart, schedule information of the communication counterpart, communication state information of the communication counterpart, presence information of the communication counterpart, identification of a communication service to which the communication counterpart is subscribed, and state information corresponding to an electronic device that is associated with the communication counterpart.

4. The electronic device of claim 1, wherein each of the plurality of communication applications comprises an application for providing communication related information.

5. The electronic device of claim 1, wherein each of the plurality of communication applications comprises at least one of a telephony application, a messaging application, and an e-mail application.

6. The electronic device of claim 4, wherein the communication related information comprises at least one of a contacts list, a call log, a missed call log, an outgoing call log, and an incoming call log.

7. The electronic device of claim 1, wherein each of the plurality of communication applications is assigned a respective priority and the specific communication application is identified based on the specific communication application's respective priority.

8. The electronic device of claim 7, wherein the respective priority of the specific communication application is determined based on the situation information of the communication counterpart.

9. The electronic device of claim 1, wherein the processor is further configured to:
  transmit to the communication counterpart's electronic device or the external server a request for the situation information, and receive the situation information of the communication counterpart in response to the request.

10. The electronic device of claim 1, wherein the situation information is received from the external server in real-time.

11. The electronic device of claim 1, the processor further configured to:
  responsive to receiving an incoming communication request from the communication counterpart, display an incoming communication request screen on the display unit;
  responsive to detecting an input, display a second menu including a plurality of representations corresponding to the plurality of the communication applications on the incoming communication request screen; and
  responsive to detecting selection of a particular representation from the second menu, initiate communication with the communication counterpart using a second communication application represented by the selected particular representation.

12. The electronic device of claim 1, wherein the processor is further configured to:
  in response to detecting an input for the representation, display a second representation corresponding to a second communication application among the plurality of the communication applications, the second representation being selectable to replace display of the representation in the contact list.

13. The electronic device of claim 1, wherein the processor is further configured to replace the representation of the specific communication application with a second representation corresponding to a second communication application in response to a predetermined gesture being performed while the representation is selected.

14. A method in an electronic device, comprising:
storing, in a memory, data related to a plurality of communication applications and information on a contact list;
acquiring, for a communication counterpart in the contact list, situation information of the communication counterpart from the communication counterpart's electronic device or an external server collecting information on a plurality of users including the communication counterpart;
detecting a request for displaying the contact list; and
in response to the request for displaying the contact list, displaying, for the communication counterpart in the contact list, a representation corresponding to a specific communication application from among the plurality of communication applications, based on the situation information of the communication counterpart,
wherein the situation information includes one of a location of the communication counterpart and a schedule of the communication counterpart.

15. The method of claim 14, further comprising:
identifying, for the communication counterpart in the contact list, the specific communication application from among the plurality of communication applications, based on whether the situation information of the communication counterpart satisfies a preset condition; and
in response to detecting a first input selecting the representation of the specific communication application, displaying a menu proximate to the representation listing other applications of the plurality of communication applications selectable to contact the communication counterpart.

16. The method of claim 14, wherein the situation information comprises at least one of location information of the communication counterpart, schedule information of the communication counterpart, communication state information of the communication counterpart, presence information of the communication counterpart, identification of a communication service to which the communication counterpart is subscribed, and state information corresponding to an electronic device that is associated with the communication counterpart.

17. The method of claim 14, wherein each of the plurality of communication applications comprises an application for providing communication related information.

18. The method of claim 14, wherein each of the plurality of communication applications comprises at least one of a telephony application, a messaging application, and an e-mail application.

19. The method of claim 17, wherein the communication related information comprises at least one of a contacts list, a call log, a missed call log, an outgoing call log, and an incoming call log.

20. The method of claim 14, wherein each one of the plurality of communication applications is assigned a respective priority and the specific communication application is identified based on the specific communication application's respective priority.

21. The method of claim 20, wherein the respective priority of a specific communication application is determined based on the situation information of the communication counterpart.

22. The method of claim 14, further comprising transmitting to the communication counterpart's electronic device or the external server a request for the situation information, and receive the situation information of the communication counterpart in response to the request.

23. The method of claim 14, wherein the situation information is received from the external server in real-time.

24. The method of claim 14, further comprising:
responsive to receiving an incoming communication request from the communication counterpart, displaying an incoming communication request screen;
responsive to detecting an input, displaying a second menu including a plurality of representations corresponding to the plurality of the communication applications on the incoming communication request screen; and
responsive to detecting selection of a particular representation from the second menu, initiating communication with the communication counterpart using a second communication application represented by the selected particular representation.

25. The method of claim 14, further comprising:
displaying a second representation corresponding to a second communication application among the plurality of the communication applications, the second representation being selectable to replace display of the representation in the contact list.

26. The method of claim 14, further comprising replacing the representation of the specific communication application with a second representation corresponding to a second communication application in response to a predetermined gesture being performed while the representation is selected.

* * * * *